(12) United States Patent
Kim

(10) Patent No.: US 10,304,437 B2
(45) Date of Patent: May 28, 2019

(54) SOUND ABSORBING AND INSULATING MATERIAL WITH SUPERIOR MOLDABILITY AND APPEARANCE AND METHOD FOR MANUFACTURING THE SAME

(71) Applicant: Hyundai Motor Company, Seoul (KR)

(72) Inventor: Keun Young Kim, Gyeonggi-Do (KR)

(73) Assignee: Hyundai Motor Company, Seoul (KR)

(*) Notice: Subject to any disclaimer, the term of this patent is extended or adjusted under 35 U.S.C. 154(b) by 363 days.

(21) Appl. No.: 15/185,730

(22) Filed: Jun. 17, 2016

(65) Prior Publication Data
US 2016/0297174 A1 Oct. 13, 2016

Related U.S. Application Data

(63) Continuation of application No. PCT/KR2014/002863, filed on Apr. 3, 2014.

(30) Foreign Application Priority Data

Dec. 19, 2013 (KR) .......................... 10-2013-0159410

(51) Int. Cl.
*B32B 1/00* (2006.01)
*B32B 5/02* (2006.01)
(Continued)

(52) U.S. Cl.
CPC .............. *G10K 11/168* (2013.01); *B32B 1/00* (2013.01); *B32B 5/022* (2013.01); *B32B 5/26* (2013.01);
(Continued)

(58) Field of Classification Search
CPC ......... G10K 11/168; B32B 1/00; B32B 5/022; B32B 5/26; B32B 7/12; B32B 7/10;
(Continued)

(56) References Cited

U.S. PATENT DOCUMENTS 6,487,822 B1 * 12/2002 Haack ................... E04B 9/0435
181/290
6,524,691 B2 * 2/2003 Sugawara ................ B32B 5/02
181/286

(Continued)

FOREIGN PATENT DOCUMENTS

CN 1842698 A 10/2006
CN 101189380 A 5/2008
(Continued)

OTHER PUBLICATIONS

International Search Report—PCT/KR2014/002863, dated May 21, 2014.
(Continued)

*Primary Examiner* — Forrest M Phillips
(74) *Attorney, Agent, or Firm* — Mintz Levin Cohn Ferris Glovsky and Popeo, P.C.; Peter F. Corless

(57) ABSTRACT

The present invention relates to a sound absorbing and insulating material with superior moldability and appearance and a method for manufacturing the same, more particularly to a sound absorbing and insulating material consisting of an inner layer 1 formed of a first nonwoven fabric mainly formed of a heat-resistant fiber and a binder uniformly distributed inside the first nonwoven fabric and maintaining the three-dimensional structure inside the first nonwoven fabric and an outer layer 2', 2'' formed of a second nonwoven fabric mainly formed of a heat-resistant fiber, wherein the outer layer is stacked on one or both sides of the inner layer, and a method for manufacturing the same. The sound absorbing and insulating material of the present invention has superior sound-absorbing property, flame retardancy, heat resistance, heat-insulating property and high-temperature moldability. In addition, there is no con-
(Continued)

cern of deterioration of surface appearance caused by leakage of the binder due to the presence of the outer layer.

41 Claims, 6 Drawing Sheets

(51) Int. Cl.
| | |
|---|---|
| *B32B 5/26* | (2006.01) |
| *B32B 7/12* | (2006.01) |
| *B32B 37/06* | (2006.01) |
| *B32B 37/10* | (2006.01) |
| *B32B 37/12* | (2006.01) |
| *B32B 37/14* | (2006.01) |
| *B32B 38/12* | (2006.01) |
| *B60R 13/08* | (2006.01) |
| *F16L 59/02* | (2006.01) |
| *D04H 1/4374* | (2012.01) |
| *G10K 11/168* | (2006.01) |

(52) U.S. Cl.
CPC ............... *B32B 7/12* (2013.01); *B32B 37/06* (2013.01); *B32B 37/10* (2013.01); *B32B 37/12* (2013.01); *B32B 37/14* (2013.01); *B32B 38/12* (2013.01); *B60R 13/08* (2013.01); *D04H 1/4374* (2013.01); *F16L 59/02* (2013.01); *B32B 2250/20* (2013.01); *B32B 2250/40* (2013.01); *B32B 2260/021* (2013.01); *B32B 2260/023* (2013.01); *B32B 2260/046* (2013.01); *B32B 2262/0269* (2013.01); *B32B 2262/0276* (2013.01); *B32B 2262/10* (2013.01); *B32B 2262/101* (2013.01); *B32B 2262/103* (2013.01); *B32B 2262/105* (2013.01); *B32B 2262/106* (2013.01); *B32B 2305/20* (2013.01); *B32B 2307/102* (2013.01); *B32B 2307/304* (2013.01); *B32B 2307/3065* (2013.01); *B32B 2307/718* (2013.01); *B32B 2307/738* (2013.01); *B32B 2605/00* (2013.01)

(58) Field of Classification Search
CPC .. B32B 7/14; B32B 7/06; B32B 38/12; D04H 1/4374; F16L 59/02
USPC ........................................................ 181/290
See application file for complete search history.

(56) References Cited

U.S. PATENT DOCUMENTS

| | | | |
|---|---|---|---|
| 6,554,101 B2 * | 4/2003 | Watanabe | ................ B64C 1/40 |
| | | | 181/290 |
| 6,613,424 B1 * | 9/2003 | Putt | ........................ B32B 13/04 |
| | | | 428/312.4 |
| 8,278,228 B2 | 10/2012 | Kaneda | |
| 9,805,708 B2 | 10/2017 | Kim | |
| 2009/0117806 A1 | 5/2009 | Kaneda | |
| 2011/0253474 A1 | 10/2011 | Castagnetti et al. | |
| 2012/0321868 A1 | 12/2012 | Richardson, III et al. | |

FOREIGN PATENT DOCUMENTS

| | | |
|---|---|---|
| EP | 1733827 A1 | 12/2006 |
| JP | 3083182 B2 | 9/2000 |
| JP | 2005-335279 A | 12/2005 |
| JP | 2007-039826 A | 2/2007 |
| JP | 2007-138953 A | 6/2007 |
| JP | 2008-026517 A | 2/2008 |
| JP | 2009-078446 A | 4/2009 |
| JP | 2013-139188 A | 7/2013 |
| KR | 10-2006-0003276 | 1/2006 |
| KR | 10-2006-0111330 A | 10/2006 |
| KR | 2006-0111330 | 10/2006 |
| KR | 2007-0033310 | 3/2007 |
| KR | 10-2008-0017302 | 2/2008 |
| WO | 2007/134391 A1 | 11/2007 |
| WO | 2013/127368 A1 | 9/2013 |

OTHER PUBLICATIONS

International Preliminary Report on Patentability for International Application No. PCT/KR2014/002863 dated Jun. 21, 2016, and Written Opinion, 13 pages.
Dong Yanming, "Polymer Research Method", Sinopec Press, Apr. 2011, pp. 296-297.

\* cited by examiner

SOUND ABSORBING AND INSULATING MATERIAL WITH SUPERIOR MOLDABILITY AND APPEARANCE AND METHOD FOR MANUFACTURING THE SAME

CROSS-REFERENCE TO RELATED APPLICATIONS

This application claims the benefit of International Application No. PCT/KR2014/002863, filed Apr. 3, 2014, which also claims under 35 U.S.C. § 119, the priority of Korean Patent Application No. 10-2013-0159410, filed on Dec. 19, 2013, in the Korean Intellectual Property Office, the disclosure of which is incorporated herein by reference in its entirety.

BACKGROUND (a) Technical Field

The present invention relates to a sound absorbing and insulating material with superior moldability and appearance and a method for manufacturing the same. The sound absorbing and insulating material may comprise: (1) an inner layer 1 comprising a first nonwoven fabric comprising a heat-resistant fiber and a binder uniformly distributed inside the first nonwoven fabric and maintaining the three-dimensional structure inside the first nonwoven fabric, and (2) an outer layer (2', 2'') formed of a second nonwoven fabric comprising a heat-resistant fiber. Particularly, the outer layer may be stacked on one or both sides of the inner layer. Accordingly, the sound absorbing and insulating material of the present invention may have superior sound-absorbing property, flame retardancy, heat resistance, heat-insulating property and high-temperature moldability. In addition, deterioration of surface appearance caused by leakage of the binder may be prevented due to the presence of the outer layer.

(b) Background Art

Noise, as an unwanted side effect of industrial development, causes gradually more damages. Accordingly, various methods have been provided taken to prevent noise. As a way of such noise prevention, researches for developing new sound absorbing and insulating materials capable of arresting, absorbing or reducing sound have been conducted in various ways.

Representative industrial sectors requiring sound absorbing and insulating materials include electric appliances such as an air conditioner, a refrigerator, a washing machine, a lawn mower and the like, transportation such as a vehicle, a ship, an airplane and the like, construction materials such as a wall material, a flooring material and the like, and so forth. The sound absorbing and insulating material may also be required in other various industrial fields, too. In general, the sound absorbing and insulating materials used in industries require, in addition to good sound-absorbing property, reduced weight, flame retardancy, heat resistance and heat-insulating property, depending on particular applications. Particularly, flame retardancy and heat resistance may be additionally required, particularly when those materials are used for sound absorbing and insulating materials used in engines, exhaust systems and the like where a high temperature of about 200° C. or greater is maintained. For example, an aramid fiber has been used gaining attentions for sound absorbing and insulating materials having superior heat resistance.

In addition, in order to provide functionalities such as flame retardancy, water repellency and the like to a sound absorbing and insulating material, many sound absorbing materials made of a nonwoven fabric containing aramid fibers and a functional skin material may be stacked.

For example, Korean Patent Publication No. 2007-0033310 discloses a flame-retardant sound absorbing material wherein a nonwoven fabric layer in which a heat-resistant short aramid fiber and a short thermoplastic polyester fiber are bridged and a skin material layer formed of a wetlaid nonwoven fabric consisting of a short aramid fiber are stacked.

In addition, Japanese Patent Publication No. 2007-0039826 discloses a water-repellent sound absorbing material wherein a nonwoven fabric layer of a heat-resistant short aramid fiber or a blend of a short aramid fiber and a short thermoplastic polyester fiber and a skin material layer treated with a water repellent are stacked.

Further, Japanese Patent Publication No. 2007-0138953 discloses a heat-resistant sound absorbing material wherein a nonwoven fabric layer consisting of a heat-resistant aramid fiber and a skin material layer formed of a fiber sheet containing a heat-resistant aramid fiber are stacked.

Since those sound absorbing materials described above have a structure comprising a skin material layer laminated on one side of a nonwoven fabric to provide functionalities such as flame retardancy, water repellency and the like, a hot pressing process for integrating the nonwoven fabric layer and the skin material layer may be necessary. Consequently, the overall process may be complicated and troublesome and a flame retardant, a water repellent and the like included as additives may cause production of toxic gases as a result of combustion during the hot pressing process. In addition, deformation of the internal structure of the nonwoven fabric that may occur during the hot pressing process can lead to deterioration of sound-absorbing property.

The description provided above as a related art of the present invention is just merely for helping understanding of the background of the present invention and should not be construed as being included in the related art known by those skilled in the art.

SUMMARY

In preferred aspects, the present invention provides a new sound absorbing and insulating material having superior sound-absorbing property, flame retardancy, heat resistance and heat-insulating property and having superior moldability and surface appearance. In addition, the sound absorbing and insulating material may provide the effects that physical properties of a nonwoven fabric including sound-absorbing property are improved because a binder penetrates into the nonwoven fabric having irregular micro cavities with a complicated three-dimensional labyrinth structure without blocking the micro cavities and is cured while maintaining the three-dimensional structure in the inner layer. Further, a desired shape may be molded during the curing of the binder and leakage of the binder impregnated in the nonwoven fabric to the surface of the molded product may be prevented at the same time.

The term "micro cavity(cavities)", as used herein, refers to a space or vacancy formed inside a nonwoven fabric layer and formed by fibers and may be regularly or irregularly arranged in the inner layer. Further, the micro cavities may be formed by any kinds of material in the inner layer, whether inherently existed or subsequently added. The micro cavities also may be formed by a binder, a resin additive, or the like, without limitation. The micro cavities may be open to outside of the nonwoven fabric or be connected therebetween in the inner layer. The micro cavities may include various shapes of internal cavities such as a pore, an open-ended or closed hole, a labyrinth, a channel, or the like. Size dimension (diameter or width) of the micro cavities may vary from several nanometer scale to hundreds micrometer scale, without limitation. In particular, the micro cavities may provide a resonance path of sound or noise, and further provide a sound absorbing property. The resonance path of a sound in the micro cavities may not be limited to a specific frequency of sound.

Accordingly, the present invention provides a sound absorbing and insulating material that may have superior sound-absorbing property, flame retardancy, heat resistance and heat-insulating property and may be molded into a desired shape during the curing of the binder impregnated in the nonwoven fabric comprising a heat-resistant fiber. As such, the sound absorbing and insulating material may provide superior appearance of the molded product and reduce contamination of a mold even after repeated molding due to the presence of an outer layer.

The present invention also provides a method for manufacturing a sound absorbing and insulating material. The method may comprise steps of: preparing an inner sound absorbing and insulating layer by immersing a first nonwoven fabric comprising a heat-resistant fiber in a binder solution and then drying the immersed first nonwoven fabric, stacking an outer sound absorbing and insulating layer comprising a second nonwoven fabric comprising a heat-resistant fiber on one or both sides of the inner layer.

Unless otherwise indicated herein, an "inner layer" refers to the inner sound absorbing and insulating layer constituting the sound absorbing and insulating material of the invention and an "outer layer" refers to the outer sound absorbing and insulating layer constituting the sound absorbing and insulating material of the invention.

The present invention further provides a method for reducing noise using by using the sound absorbing and insulating material in a noise-generating device.

In one aspect, the present invention provides a sound absorbing and insulating material that may comprise: (1) an inner layer including a first nonwoven fabric comprising an amount of about 30 to 100 wt % of a heat-resistant fiber based on the total weight of the first nonwoven fabric and a binder present in the same layer as the first nonwoven fabric and maintaining a three-dimensional structure in the inner layer; and (2) an outer layer comprising a second nonwoven fabric comprising an amount of about 30 to 100 wt % of a heat-resistant fiber based on the total weight of the first nonwoven fabric. In particular, the outer layer may be stacked on one or both sides of the inner layer 1.

The term "binder", as used herein, refers to a resin or a polymeric material that can be polymerized or cured to form a polymeric matrix. The binder may be cured (polymerized) or partially cured upon curing process such as heating, UV radiation, electron beaming, chemical polymerization using additives and the like. Preferably, the binder of the present invention may contain polyamic acid that can be polymerized into polyimide upon heating. Preferably, the binder according to the present invention generally refers to a polyimide binder.

The inner layer and the outer layer suitably may be stacked by an adhesive, heat or pressure.

Preferably, an adhesive may be coated on one side of the outer layer and then the outer layer is stacked by contacting the adhesive-coated side with the inner layer. The adhesive used for the stacking between the inner layer and the outer layer may be the same binder included in the first nonwoven fabric.

Preferably, the adhesive may be a thermosetting resin.

Preferably, the heat-resistant fiber constituting the first nonwoven fabric or the second nonwoven fabric may have a limiting oxygen index (LOI) of about 25% or greater and a heat resistance temperature of about 150° C. or greater.

The term "limiting oxygen index (LOI)" as used herein refers to a minimum concentration of oxygen, expressed as a percentage, that will support combustion of a polymer. The LOI can be measured by passing a mixture of oxygen and nitrogen over a burning specimen, and reducing the oxygen level until a critical level is reached. The LOI values for different plastics or polymers, for example, an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, basalt fiber, a silica fiber and a ceramic fiber, can be determined by standardized tests, such as the ISO 4589 and ASTM D2863.

The heat-resistant fiber suitably may be one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber.

Preferably, the heat-resistant fiber may be an aramid fiber.

The first nonwoven fabric or the second nonwoven fabric suitably may comprise formed of an aramid fiber having a fineness of about 1 to 15 denier and may be a single-layered nonwoven fabric having a thickness of about 3 to 20 mm.

The first nonwoven fabric or the second nonwoven fabric suitably may have a density of about 100 to 2000 $g/m^2$. In addition, the first nonwoven fabric or the second nonwoven fabric suitably may have a density of about 200 to 1200 $g/m^2$.

The inner layer may be formed in a single layer or multiple layers.

The binder included in the inner layer may be a thermosetting resin. Preferably, the thermosetting resin as of the binder of the adhesive may be an epoxy resin. The epoxy resin suitably may be one or more epoxy resin selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin and an o-cresol novolac epoxy resin.

The sound absorbing and insulating material may be molded to have a three-dimensional shape corresponding to that to which the sound absorbing and insulating material is applied.

The sound absorbing and insulating material may be for a vehicle.

Further provided is a vehicle that may comprise the sound absorbing and insulating material as described herein.

In another aspect, the present invention provides a method for manufacturing a sound absorbing and insulating material. The method may comprise steps of: a) immersing a first nonwoven fabric comprising an amount of about 30 to 100 wt % of a heat-resistant fiber in a binder solution; b) forming an inner layer by drying the first nonwoven fabric; c)

preparing an outer layer comprising a second nonwoven fabric comprising an amount of about 30 to 100 wt % of a heat-resistant fiber; and d) stacking the outer layer on one or both sides of the inner layer 1.

The method may further comprise, after the step d), a step of e) molding the sound absorbing and insulating material at a temperature of about 150 to 300° C.

In the step b), the first nonwoven fabric may be dried at a temperature of about 70 to 200° C. and the inner layer formed by the drying may comprise an amount of about 1 to 300 parts by weight of a binder based on 100 parts by weight of the nonwoven fabric.

In the step d), the outer layer may be stacked on the inner layer by an adhesive, heat or pressure.

In the step d), an adhesive may be coated on one side of the second nonwoven fabric and the side on which the adhesive has been coated is contacted with the inner layer.

Preferably, the adhesive may be the same binder included in the first nonwoven fabric.

Preferably, the adhesive may be a thermosetting resin.

The heat-resistant fiber constituting the first nonwoven fabric or the second nonwoven fabric suitably may have a limiting oxygen index (LOI) of about 25% or greater and a heat resistance temperature of 150° C. or greater.

The heat-resistant fiber of the first nonwoven fabric or the second nonwoven suitably may be one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, basalt fiber, a silica fiber and a ceramic fiber. In particular, the heat-resistant fiber may be an aramid fiber having a fineness of about 1 to 15 denier and a yarn length of about 20 to 100 mm.

The first nonwoven fabric or the second nonwoven fabric suitably may have a thickness of about 3 to 20 mm and a density of about 100 to 2000 g/m$^2$.

The first nonwoven fabric or the second nonwoven fabric may be an aramid nonwoven fabric having a thickness of about 3 to 20 mm, formed by needle punching of a heat-resistant aramid fiber having a fineness of about 1 to 15 denier.

The first nonwoven fabric or the second nonwoven may be formed by continuously performing up-down needling, down-up needling and up-down needling. Preferably, the first nonwoven fabric or the second nonwoven fabric may be formed with a needle stroke of about 30 to 350 times/m$^2$.

The binder solution in the step a) may comprise an amount of about 1 to 60 wt % of a binder, an amount of about 0.1 to 10 wt % of a curing agent, an amount of about 0.01 to 5 wt % of a catalyst, an amount of about 1 to 40 wt % of an additive and a solvent constituting the remaining balance of the binder solution, all the wt % based on the total weight of the binder solution. Alternatively, the binder solution may comprise an amount of about 1 to 30 wt % of a binder, an amount of about 0.1 to 10 wt % of a curing agent, an amount of about 0.01 to 5 wt % of a catalyst, an amount of about 1 to 30 wt % of a flame retardant and an amount of about 40 to 95 wt % of a solvent constituting the remaining balance of the binder solution, all the wt % based on the total weight of the binder solution.

Preferably, the binder may be a thermosetting resin.

Preferably, the thermosetting resin for the binder or the adhesive may be an epoxy resin.

The epoxy resin suitably may be one or more selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin and an o-cresol novolac epoxy resin.

The above described sound absorbing and insulating material may be used for a vehicle.

In another aspect, the present invention provides a method for reducing noise of a noise-generating device, comprising steps of: i) checking a three-dimensional shape of a noise-generating device; ii) preparing and molding a sound absorbing and insulating material so as to correspond to the three-dimensional shape of the device partially or entirely; and iii) bringing the sound absorbing and insulating material adjacent to the noise-generating device.

The term "partially" as used herein covers a portion of surface from the total surface of a device. For example, the partially corresponding molded material may cover 10% or less, 20% or less, 30% or less, 40% or less, 50% or less, 60% or less, 70% or less, 80% or less, 90% or less, or 95% or less from the total structure or surface of a device.

For example, the noise-generating device may be a motor, an engine or an exhaust system.

Preferably, the sound absorbing and insulating material may be brought adjacent to the noise-generating device by attaching the sound absorbing and insulating material to the noise-generating device, providing the sound absorbing and insulating material with a distance from the noise-generating device, or molding the sound absorbing and insulating material as a part of the noise-generating device.

Further provided is a vehicle that comprises the sound absorbing and insulating material as described therein.

Other aspects of the invention are disclosed infra.

The sound absorbing and insulating material of the present invention may include a binder that is impregnated into the first nonwoven fabric formed of a heat-resistant fiber. As such, the sound absorbing and insulating material may have superior sound-absorbing property, flame retardancy, heat resistance and heat-insulating property and it can be molded into a three-dimensional shape due to the binder.

In addition, since the outer layer including a second nonwoven fabric may be stacked on one or both sides of the inner layer, leakage of the binder included in the inner layer during molding may be prevented and the molded product may have superior appearance without contamination of a mold.

Further, the sound absorbing and insulating material may be prepared by further adding a functional additive in a binder solution, and desired functionality maybe provided to the sound absorbing and insulating material without stacking an additional skin material.

Since flame retardancy, heat resistance and heat-insulating property are superior in addition to sound-absorbing property, the sound absorbing and insulating material may not be deformed or denatured even when used in a noise-generating device maintained at high temperatures of about 200° C. or above.

Further, when a thermosetting resin is used as the binder, molding into a desired shape may be possible during the curing of the thermosetting resin. That is to say, the overall process may be simplified since the curing and molding of the thermosetting resin are achieved simultaneously.

Moreover, since a nonwoven fabric formed of a heat-resistant fiber is used, thermal deformation of the nonwoven fabric due to the reaction heat of thermal curing may not occur even when a thermosetting resin is used as the binder.

Accordingly, the sound absorbing and insulating material of the present invention may be useful as a sound absorbing and insulating material in the applications requiring arresting, absorbing or insulating of sound, including electric appliances such as air conditioner, refrigerator, washing machine, lawn mower and the like, transportation such as automobile, ship, airplane and the like, construction materials such as wall material, flooring material and the like, and so forth. The sound absorbing and insulating material of the present invention is useful as a sound absorbing and insulating material for a noise-generating device maintained at high temperatures of 200° C. or greater. In particular, when the sound absorbing and insulating material of the present invention is used in a vehicle, it may be closely attached to a noise-generating device of the automobile such as engine, exhaust system and the like, provided with a distance from the noise-generating device, or molded as a part of the noise-generating device.

BRIEF DESCRIPTION OF DRAWINGS

The above and other objects, features and advantages of the present invention will be more clearly understood from the following detailed description taken in conjunction with the accompanying drawing, in which:

FIG. 1A shows the cross-sectional structure of an exemplary sound absorbing and insulating material wherein a second nonwoven fabric 1 (not impregnated with a binder) is stacked on one side of a first nonwoven fabric 1 (uniformly impregnated with a binder), with an adhesive layer 3 disposed therebetween. FIG. 1B shows the cross-sectional structure of an exemplary sound absorbing and insulating material wherein two second nonwoven fabrics 2', 2" (not impregnated with a binder) are stacked on both sides of a first nonwoven fabric 1 (uniformly impregnated with a binder), with adhesive layers 3 disposed therebetween.

FIG. 2A shows a microscopic image of an exemplary first nonwoven fabric before impregnation of a binder, FIG. 2B shows a microscopic image of an exemplary first nonwoven fabric in which 20 parts by weight of a binder has been impregnated based on 100 parts by weight of the nonwoven fabric.

FIG. 3A shows an image of an exemplary sound absorbing and insulating material molded for use in a vehicle engine, and (B) shows an example wherein an exemplary sound absorbing and insulating material is applied in a part of a vehicle engine.

FIG. 4A shows an image of an exemplary sound absorbing and insulating material molded for use in a lower part of a vehicle, and FIG. 4B shows an example wherein an exemplary sound absorbing and insulating material is attached to a lower part of a vehicle.

DETAILED DESCRIPTION OF MAIN ELEMENTS

Figure 1A:
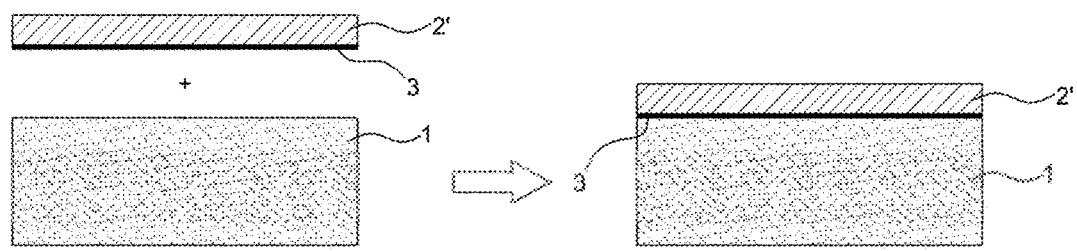
FIGS. 1A-1B schematically show the cross-sectional structure of a sound absorbing and insulating material of the present invention.

1: inner sound absorbing and insulating layer (inner layer)
2', 2": outer sound absorbing and insulating layer (outer layer)
3: adhesive layer

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention relates to a sound absorbing and insulating material with superior moldability and appearance and a method for manufacturing the same. The sound absorbing and insulating material of the present invention may have superior sound-absorbing property, flame retardancy, heat resistance, heat-insulating property. In addition, the sound absorbing and insulating material of the present invention may be moldable into a desired three-dimensional shape using a binder present in the same layer as a nonwoven fabric formed of a heat-resistant fiber, such that the appearance problem of a molded product caused by leakage of the binder during molding may be prevented.

In one aspect, the present invention provides a sound absorbing and insulating material including: an inner layer 1 comprising a first nonwoven fabric comprising an amount of about 30 to 100 wt % of a heat-resistant fiber based on the total weight of the first nonwoven fabric and a binder present in the same layer as the first nonwoven fabric and maintaining a three-dimensional structure in the inner layer; and an outer layer 2', 2" comprising a second nonwoven fabric comprising an amount of about 30 to 100 wt % of a heat-resistant fiber based on the total weight of the first nonwoven fabric. In particular, the outer layer 2', 2" may be stacked on one or both sides of the inner layer 1. For example, the outer layer 2' may be stacked on an upper side of the inner layer, the outer layer 2" may be stacked on a lower side of the inner layer 1, or both the outer layer 2', 2" may be stacked on the upper side and the lower side of the inner layer 1, respectively.

In an exemplary embodiment of the present invention, the inner layer and the outer layer may be stacked by an adhesive, heat or pressure.

In an exemplary embodiment of the present invention, an adhesive may be coated on one side of the outer layer and then the outer layer may be stacked by contacting the adhesive-coated side with the inner layer.

In an exemplary embodiment of the present invention, the adhesive used for the stacking between the inner layer and the outer layer may be the same binder included in the first nonwoven fabric.

In an exemplary embodiment of the present invention, the adhesive may be a thermosetting resin.

In an exemplary embodiment of the present invention, the heat-resistant fiber may suitably have a limiting oxygen index (LOI) of about 25% or greater and a heat resistance temperature of about 150° C. or greater.

In an exemplary embodiment of the present invention, the heat-resistant fiber suitably may be one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber.

In another exemplary embodiment of the present invention, the heat-resistant fiber may be an aramid fiber.

In an exemplary embodiment of the present invention, the first nonwoven fabric or the second nonwoven fabric may comprise an aramid fiber, as a heat-resistant fiber, having a fineness of about 1 to 15 denier and may be a single-layered nonwoven fabric having a thickness of about 3 to 20 mm.

In an exemplary embodiment of the present invention, the first nonwoven fabric or the second nonwoven fabric may have a density of about 100 to 2000 g/m$^2$.

In another exemplary embodiment of the present invention, the first nonwoven fabric or the second nonwoven fabric may have a density of about 200 to 1200 g/m$^2$.

In an exemplary embodiment of the present invention, the inner layer may be formed in a single layer or two or more layers.

In an exemplary embodiment of the present invention, the binder may be a thermosetting resin.

In another exemplary embodiment of the present invention, the thermosetting resin may be an epoxy resin capable of forming a three-dimensional network structure in the internal structure of the first nonwoven fabric.

In another exemplary embodiment of the present invention, the epoxy resin suitably may be one or more epoxy resin selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin and an o-cresol novolac epoxy resin.

The structure of the sound absorbing and insulating material according to the present invention is described in more detail referring to FIGS. 1A-1B and FIGS. 2A-2C.

Figure 1B:
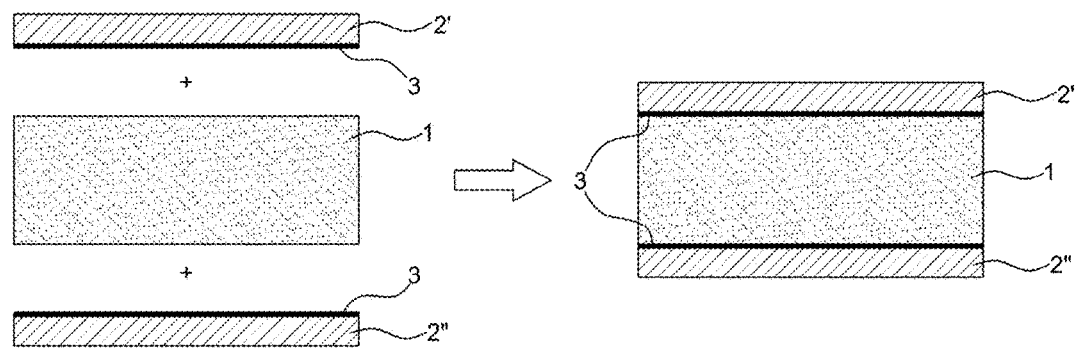

FIGS. 1A-1B schematically show the cross-sectional structure of a sound absorbing and insulating material of the present invention. FIG. 1A shows the cross section of an exemplary sound absorbing and insulating material wherein an outer layer 2' is formed as a second nonwoven fabric is stacked on one side of an inner layer 1 including a first nonwoven fabric and a binder, with an adhesive layer 3 disposed therebetween. FIG. 1B shows the cross section of an exemplary sound absorbing and insulating material wherein outer layers 2', 2" are formed as two second nonwoven fabrics are stacked on both sides of an inner layer 1 including a first nonwoven fabric and a binder, with adhesive layers 3 disposed therebetween.

Figure 2A:
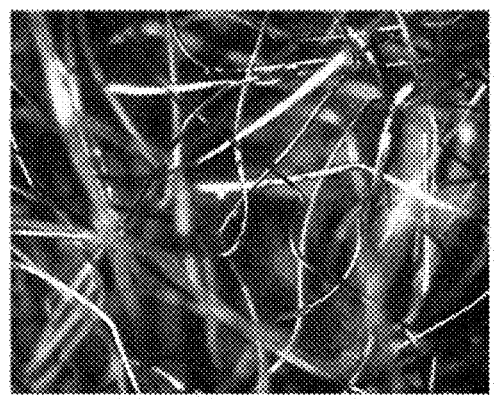
FIGS. 2A-2B shows electron microscopic images (×300) of an exemplary first nonwoven fabric before and after impregnation of a binder.
Figure 2B:
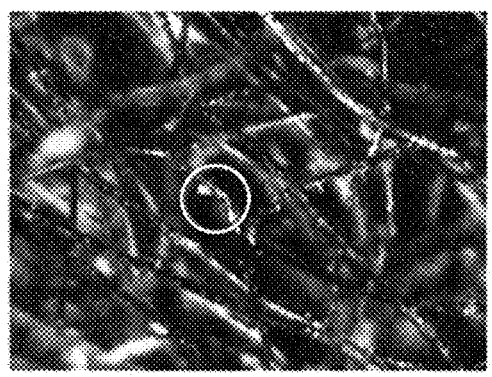
Figure 2C:
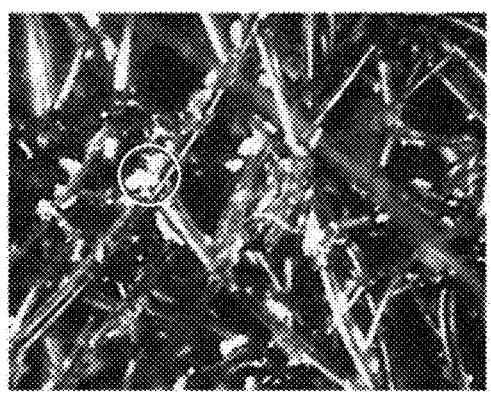
FIG. 2C shows a microscopic image of an exemplary first nonwoven fabric in which 50 parts by weight of a binder has been impregnated based on 100 parts by weight of the nonwoven fabric.

FIGS. 2A-2C shows electron microscopic images showing the three-dimensional structure inside the first nonwoven fabric constituting the inner layer 1.

FIG. 2A shows an electron microscopic image showing the internal structure of the first nonwoven fabric before impregnation of the binder. It can be seen that heat-resistant fiber yarns cross each other to form irregular micro cavities. FIG. 2B and FIG. 2C are electron microscopic images after impregnation of the binder into the first nonwoven fabric. It can be seen that the binder is finely and uniformly distributed and attached to the heat-resistant fiber yarns. Also, it can be seen that the content of the binder on the yarn surface increases as the content of the binder increases.

Although there may be differences depending on the preparation method, fibers are randomly arranged three-dimensionally in the first nonwoven fabric or the second nonwoven fabric used for the preparation of the sound absorbing and insulating material in the present invention. Accordingly, the pore structure inside a nonwoven fabric tends to be a very complicated labyrinth structure (labyrinth system) wherein regularly or irregularly arranged fibers are three-dimensionally interconnected rather than bundles of independent capillary tubes. That is to say, the nonwoven fabric used in the present invention may have irregular micro cavities (micro cavity) formed as the yarns formed of the heat-resistant fiber loosely cross each other.

When the binder is impregnated into the nonwoven fabric, the binder may be finely and uniformly distributed and attached to the surface of the nonwoven fabric yarns formed of the heat-resistant fiber, thereby forming much finer micro cavities than before the impregnation. The formation of fine micro cavities in the internal structure of the nonwoven fabric may increase resonance of noise and thus improved sound-absorbing property. In addition, when the binder forms a three-dimensional network structure as it is cured, the sound-absorbing property can be further improved since more numbers of the fine micro cavities can be formed inside the nonwoven fabric in the inner layer.

Accordingly, since the nonwoven fabric can maintain the intrinsic three-dimensional structure as the binder may be uniformly impregnated into the nonwoven fabric and, additionally, since more numbers of the fine micro cavities may be formed as the binder is cured, the sound absorbing and insulating material of the present invention may have remarkably improved sound-absorbing performance due to the maximized noise absorption through increased resonance in the nonwoven fabric.

As shown in the electron microscopic images of FIG. 2, the inner layer of the present invention may have an internal structure in which the binder may be uniformly dispersed and distributed on the surface of the heat-resistant fiber yarns constituting the nonwoven fabric.

Hereinafter, the constituents of the sound absorbing and insulating material according to the present invention having such an internal structure are described in more detail.

In the present invention, a heat-resistant fiber may be used as the main fiber constituting the first nonwoven fabric or the second nonwoven fabric.

The heat-resistant fiber may be any one having superior durability and capable of enduring high-temperature and ultrahigh-temperature conditions. Preferably, the heat-resistant fiber may be one having a limiting oxygen index (LOI) of about 25% or greater and a heat resistance temperature of about 150° C. or greater. For example, the heat-resistant fiber may be one having a limiting oxygen index (LOI) of about 25 to 80% and a heat resistance temperature of about 150 to 30000° C. In particular, the heat-resistant fiber may be one having a limiting oxygen index (LOI) of about 25 to 70% and a heat resistance temperature of about 200 to 1000° C.

Preferably, the heat-resistant fiber may have a fineness of about 1 to 15 denier, or particularly of about 1 to 6 denier and a yarn length of about 20 to 100 mm, or particularly of about 40 to 80 mm.

The heat-resistant fiber may be a 'super fiber' as commonly known in the related art. Preferably, the super fiber may be one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, basalt fiber, a silica fiber and a ceramic fiber.

Particularly, an aramid fiber may be used as the heat-resistant fiber in the present invention. Preferably, meta-aramid, para-aramid or a mixture thereof may be used as the heat-resistant fiber in the present invention. The aramid fiber used as the yarn of the nonwoven fabric in the present invention may have a fineness of about 1 to 15 denier, or particularly of about 1 to 6 denier, and a yarn length of about 20 to 100 mm, or particularly of about 40 to 80 mm. When the yarn length is less than the predetermined range, for example, less than about 20 mm, bridging of yarns may be difficult during needle punching. As a result, cohesion of the nonwoven fabric may be weak. When the yarn length is greater than the predetermined range, for example, greater than about 100 mm, cohesion of the nonwoven fabric may be superior but movement of yarns may be difficult during carding.

The aramid fiber may be an aromatic polyamide fiber wherein aromatic rings such as benzene ring are bonded with each other by amide groups. To distinguish from an aliphatic polyamide (e.g., nylon), the aromatic polyamide fiber is called 'aramid'. The aramid fiber is prepared by spinning of aromatic polyamide and is classified into meta-aramid and para-aramid depending on the location of the amide bonds.

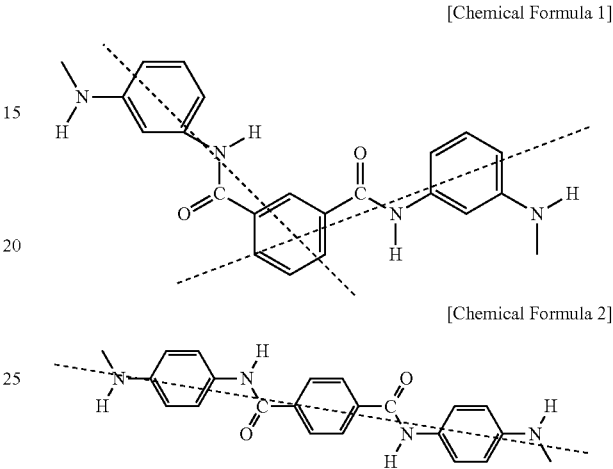

[Chemical Formula 1]

[Chemical Formula 2]

The meta-aramid (m-aramid) represented by Chemical Formula 1 may be prepared by dry spinning after dissolving isophthaloyl chloride and m-phenylenediamine in a dimethylacetamide (DMAc) solvent. The meta-aramid has a relatively high elongation at break of about 22 to 40% due to the uneven polymer structure, may be dyed and can be easily prepared into fiber. It is appreciated that the meta-aramid suitably may be provided with Nomex™ (DuPont, USA) and Conex™ (Teijin, Japan).

The para-aramid (p-aramid) represented by Chemical Formula 2 may be prepared by wet spinning after dissolving terephthaloyl chloride and p-phenylenediamine in an N-methylpyrrolidone (NMP) solvent. The para-aramid ma have high strength due to its highly oriented linear molecular structure. Being stronger than meta-aramid about 3 to 7 times, it is used for reinforcement or protection materials. The para-aramid may have strong chemical resistance, less thermal shrinkage and superior dimensional stability as well as high tensile strength, flame resistance and self-extinguishing property. It is appreciated that the para-aramid suitably may be provided with Kevlar™ (DuPont, USA), Twaron™ (Teijin, Japan) and Technora™ (Teijin, Japan).

The aramid is provided in the form of filament, staple, yarn and the like and is used for reinforcing materials (transformer, motor and the like), insulating materials (insulating paper, insulating tape and the like), heat-resistant fibers (fireproof clothing, gloves and the like), high-temperature filters, or the like.

Although the nonwoven fabric constituting the sound absorbing and insulating material of the present invention may be practically prepared from the heat-resistant fiber yarn, nonwoven fabrics prepared by further adding other fibers to the heat-resistant fiber yarn may also be included in the scope of the present invention to reduce cost or provide reduced weight, functionality and the like to the nonwoven fabric. That is to say, although the nonwoven fabric of the present invention may be prepared from the heat-resistant fiber yarn, the present invention may not be limited to the nonwoven fabric formed only of the heat-resistant fiber. The nonwoven fabric of the present invention may include the heat-resistant fiber yarn in an amount of about 30 to 100 wt %, or particularly of about 60-100 wt %, based on the weight of the nonwoven fabric (the first or the second nonwoven fabric).

Further, the inner layer of the sound absorbing and insulating material of the present invention may include the binder as being present in the same layer as the nonwoven fabric and maintains the three-dimensional structure in the inner layer. The binder used in the present invention may be any one capable of maintaining the three-dimensional structure in the inner layer. The expression 'maintaining the three-dimensional structure in the inner layer' means that the binder, which has been impregnated into the nonwoven fabric, may be uniformly distributed and attached to the surface of the fiber yarn of the nonwoven fabric and maintains or further forms irregular micro cavities, thereby maintaining the original three-dimensional structure in the inner layer.

Although a binder generally refers to a material used to adhere or join two materials, the term binder used in the present invention refers to a material impregnated into the nonwoven fabric formed of the heat-resistant fiber.

Many materials may be used as the binder impregnated into the nonwoven fabric. For example, a thermoplastic resin or a thermosetting resin may be considered as the binder material.

The thermoplastic resin such as a polyamide-based resin may have crystalline polar groups like the aramid fiber as a representative heat-resistant fiber. As such, when a thermoplastic binder is impregnated into the nonwoven fabric formed of the thermoplastic heat-resistant fiber, a strong interfacial layer may be formed between them by face-to-face contact between the similar crystalline polar groups, which partially blocks the micro cavities of the nonwoven fabric. That is to say, when a thermoplastic resin is used as the binder impregnated into the nonwoven fabric formed of the thermoplastic heat-resistant fiber, sound-absorbing performance may be decreased owing to the partial blocking of the micro cavities of the nonwoven fabric. At a glimpse, it may be thought that the sound-absorbing performance would be improved when the micro cavities are blocked. However, since noise is not extinguished in the inner layer but is transmitted via other routes, improvement of sound-absorbing performance may not be expected when the thermoplastic binder is impregnated. Further, when the thermoplastic binder is impregnated into a nonwoven fabric formed of the inorganic-based heat-resistant fiber, an adhesive additive may be further added because of weak binding.

In contrast, a thermosetting binder may have totally different physical and chemical properties from the thermoplastic heat-resistant fiber. Accordingly, when a thermosetting binder is impregnated into the nonwoven fabric formed of the thermoplastic heat-resistant fiber, an interfacial layer may be formed by edge-to-edge contact because of the difference in characteristics. As a result, the micro cavities of the nonwoven fabric may remain open. That is to say, when a thermosetting resin is used as the binder impregnated into the nonwoven fabric formed of the heat-resistant fiber, the three-dimensional structure in the inner layer may be maintained. Accordingly, a thermosetting resin may be used preferably as the binder in the present invention.

Furthermore, the thermosetting resin may have the characteristics that it is curable with light, heat or a curing agent and its shape may not be deformed even at high temperatures. Accordingly, by using the heat-resistant fiber and the thermosetting binder with a specific condition, the present invention is advantageous in that the shape of the sound absorbing and insulating material can be maintained even at high temperatures. Accordingly, when a thermosetting resin is used as the binder impregnated into the nonwoven fabric, molding into a desired shape may be achieved during the curing of the resin and the resulting shape may be maintained even at high temperatures.

As described above, when a thermosetting resin is used as the binder impregnated into the nonwoven fabric formed of the heat-resistant fiber, the effects of maintaining the three-dimensional structure in the inner layer and molding into a desired shape during the curing of the binder resin may be expected.

Preferably, an epoxy resin may be used as the binder. The epoxy resin as a thermosetting resin may be curable into a polymer material having a three-dimensional network structure. Accordingly, since the epoxy resin may form a network structure and thus micro cavities when cured in the inner layer, more numbers of the fine micro cavities may be formed in the inner layer and the sound-absorbing performance may be further improved.

Further, since a more advanced three-dimensional network structure may be formed when the curing is carried out in the presence of a curing agent, the sound-absorbing effect may be further improved. That is to say, a three-dimensional network-structured polymer may be formed as the epoxy groups or hydroxy groups of the epoxy resin react with the functional groups of the curing agent such as amine groups or carboxylic acid groups to form covalent crosslinkages. The curing agent may not only serve as a catalyst that catalyzes curing reaction but also may be directly involved in the reaction and is linked in the molecule of the epoxy resin. Accordingly, the size and physical properties of the micro cavities may be controlled by selecting different curing agents.

The epoxy resin suitably may be one or more selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphazene diglycidyl ether, bisphenol A novolac epoxy, phenol novolac epoxy resin, o-cresol novolac epoxy resin and the like. The epoxy resin may be one having an epoxy equivalent of about 70 to 400. If the epoxy equivalent is less than the predetermined range, for example, less than about 70, intermolecular binding may be too weak to form a three-dimensional network structure or the physical properties of the sound absorbing and insulating material may be unsatisfactory because of weak adhesion with the heat-resistant fiber. When the epoxy equivalent is greater than the predetermined range, for example, greater than about 400, the physical properties of the sound absorbing and insulating material may be unsatisfactory because a very dense network structure is formed.

When a thermosetting resin is used as the binder in the present invention, the curing agent may be included in a binder solution. The curing agent may be one having functional groups that can react readily with the functional groups of the binder such as epoxy groups or hydroxy groups. As the curing agent, an aliphatic amine, an aromatic amine, an acid anhydride, urea, an amide, imidazole and the like may be suitably used. Preferably, the curing agent may be one or more selected from a group consisting of diethyltoluenediamine (DETDA), diaminodiphenylsulfone (DDS), boron trifluoride-monoethylamine ($BF_3$.MEA), diaminocyclohexane (DACH), methyltetrahydrophtalic anhydride (MTHPA), methyl-5-norbornene-2,3-dicarboxylic anhydride (NMA), dicyandiamide (Dicy), 2-ethyl-4-methylimidazole and the like. For example, an aliphatic amine- or amide-based curing agent may be used because they have relatively good crosslinking ability and very superior chemical resistance and weather resistance. Particularly, dicyandiamide (Dicy) may be used in consideration of crosslinking ability, flame retardancy, heat resistance, storage stability, processability and the like. Because dicyandiamide (Dicy) has a high melting point above 200° C., it may retain superior storage stability after being mixed with the epoxy resin and may ensure sufficient processing time for curing and molding.

Further, a catalyst that may facilitate the curing of the thermosetting resin used as the binder may be used in the present invention. The catalyst suitably may be one or more selected from a group consisting of urea, dimethylurea, a tetraphenylborate salt of quaternary DBU, quaternary phosphonium bromide and the like. The catalyst may be included in the binder-containing solution.

In addition, various additives, e.g., a flame retardant, a heat resistance improver, a water repellent and the like, may be used to provide functionalities to the sound absorbing and insulating material. The additive may be included in the binder solution and additional skin material for providing functionalities to the sound absorbing and insulating material may not be necessary.

The flame retardant may be melamine, a phosphate, a metal hydroxide and the like. Preferably, one or more selected from a group consisting of melamine, melamine cyanurate, melamine polyphosphate, phosphazene, ammonium polyphosphate and the like may be used as the flame retardant. In particular, the flame retardant may be melamine, which can enhance flame retardancy and heat resistance at the same time.

The heat resistance improver suitably may be alumina, silica, talc, clay, glass powder, glass fiber, metal powder and the like.

One or more fluorine-based water repellent may be used as the water repellent.

In addition, additives commonly used in the art may be selected and used depending on purposes.

The inner layer of the sound absorbing and insulating material of the present invention may be formed in a single layer or two or more layers. The inner layer may be formed in a single layer or multiple layers for controlling the overall thickness of the sound absorbing and insulating material. The single-layered or multiple-layered structure of the inner layer may not be particularly limited in the present invention.

In the sound absorbing and insulating material of the present invention, the outer layer formed of a second nonwoven fabric comprising an amount of about 30 100 wt % of a heat-resistant fiber based on the total weight of the second nonwoven fabric may be stacked on one or both sides of the inner layer. As the outer layer may be stacked on the outer surface of the inner layer, appearance problem due to leakage of the binder included in the inner layer during molding and contamination of a mold due to repeated molding may be prevented.

The outer layer may be stacked using an adhesive layer containing an adhesive or using heat or pressure. For example, when the stacking is performed using an adhesive, an adhesive may be coated on one side of the second nonwoven fabric and then the second nonwoven fabric may be stacked by contacting with the inner layer. The adhesive may be any one commonly used in the art. Because the binder impregnated into the inner layer in the present invention also has adhesive property, the binder may also be used as the adhesive. For example, when the same binder is used as the adhesive, a thermosetting resin may be used because stronger adhesive effect may be obtained when the thermosetting resin is cured by the heat applied during molding. Preferably, an epoxy resin may be used as the adhesive. The amount of the adhesive used may not be particularly limited in the present invention. The amount may be controlled within a range allowed for the adhesion of the two layers.

In another aspect, the present invention provides a method for manufacturing a sound absorbing and insulating material. The method may comprise steps of: a) immersing a first nonwoven fabric comprising an amount of about 30 to 100 wt % of a heat-resistant fiber based on the total weight of the first nonwoven fabric in a binder solution; b) forming an inner layer 1 by drying the first nonwoven fabric; c) preparing an outer layer 2', 2" comprising a second nonwoven fabric comprising an amount of about 30 100 wt % of a heat-resistant fiber based on the total weight of the second nonwoven fabric; and d) stacking the outer layer on one or both sides of the inner layer 1.

Hereinafter, the steps of the method for manufacturing a sound absorbing and insulating material according to the present invention are described in detail.

In the step a), a first nonwoven fabric formed of a heat-resistant fiber may be immersed in a binder solution.

In the present invention, the first nonwoven fabric may be immersed in the binder solution so as to improve sound-absorbing and sound-insulating performance and to mold the sound absorbing and insulating material into a desired shape. The binder solution in which the first nonwoven fabric is immersed may further comprise, in addition to a binder resin, a curing agent, a catalyst, commonly used additives and a solvent. The binder, the curing agent, the catalyst and the commonly used additives included in the binder solution may be the same ad described above. The solvent used to prepare the binder solution may be one or more selected from a group consisting of a ketone, a carbonate, an acetate, a cellosolve and the like. Preferably, the solvent may be one or more selected from a group consisting of acetone, methyl ethyl ketone (MEK), methyl isobutyl ketone (MIBK), dimethyl carbonate (DMC), ethyl acetate, butyl acetate, methyl cellosolve, ethyl cellosolve, butyl cellosolve and the like.

Preferably, the binder solution used in the present invention may comprise an amount of about 1 to 60 wt % of a binder and a solvent as the remainder. The binder solution used in the present invention may further comprise a curing agent and other additives including a catalyst. In this case, the binder solution may comprise an amount of about 1 to 60 wt % of a binder, an amount of about 0.1 to 10 wt % of a curing agent, an amount of about 0.01 to 5 wt % of a catalyst, an amount of about 1 to 40 wt % of additives and a solvent constituting the remaining balance of the binder solution, as all the wt % based on the total weight of the binder solution. Particularly, the binder solution may comprise an amount of about 1 to 30 wt % of a binder, an amount of about 0.1 to 10 wt % of a curing agent, an amount of about 0.01 to 5 wt % of a catalyst, an amount of about 1 to 30 wt % of a flame retardant as an additive and an amount of about 40 to 95 wt % of a solvent constituting the remaining balance of the binder solution, as all the wt % based on the total weight of the binder solution.

The degree of impregnation into the nonwoven fabric may be controlled by controlling the concentration of the binder solution of the present invention. Preferably, the binder solution may be prepared to have a solid content of 1 about 60 wt %, or particularly of about 20-50 wt %, based on the total weight of the binder solution. When the binder solution includes the solid content less than the predetermined amount, for example, less than about 1 wt %, the purpose of the present invention may not be accomplished because the content of the binder impregnated into the nonwoven fabric may be substantially reduced. When the binder solution includes the solid content greater than the predetermined amount, for example, greater than about 60 wt %, the nonwoven fabric may become hard and may not serve as a sound absorbing and insulating material.

When the content of the curing agent contained in the binder solution is less than the predetermined amount, for example, less than about 0.1 wt %, molding into a desired shape may be difficult because complete curing of the binder may not be expected. As a result, the effect of improving the mechanical strength of the sound absorbing and insulating material may be unsatisfactory. When the content is greater than the predetermined amount, for example, greater than about 10 wt %, the sound absorbing and insulating material may become hard and storage stability and the like may be unsatisfactory.

When the content of the catalyst is less than the predetermined amount, for example, less than about 0.01 wt %, the effect of facilitating reaction may be insignificant. When the content of the catalyst is greater than the predetermined amount, for example, greater than about 5 wt %, storage stability and the like may be unsatisfactory.

The additives suitably may be one or more additive(s) commonly used in the art, including a flame retardant, a heat resistance improver, a water repellent and the like. The content of these additives may be adjusted adequately depending on the purpose of addition. When the content of the additives is less than the predetermined amount, for example, less than about 1 wt %, the desired effect may not be achieved. The content of the additives greater than about 40 wt % may be economically unfavorable and may cause undesired side effects.

In the step b), an inner layer may be prepared by drying the first nonwoven fabric.

The drying in the present invention may be carried out by taking out the first nonwoven fabric from the binder solution and removing the solvent. The drying may be carried out at appropriate temperatures under pressure. Preferably, the drying process may include a process of taking out the nonwoven fabric and controlling the binder content in the nonwoven fabric by compressing at a pressure of about 1 to 20 kgf/cm². In addition, the drying process may include a process of taking out the nonwoven fabric and evaporating the solvent by heating at a temperature of about 70 to 200° C. Alternatively, the drying process may include a process of compressing the nonwoven fabric at a pressure of about 1 to 20 kgf/cm² and then heating at a temperature of about 70 to 200° C. after taking out the nonwoven fabric.

The drying in the present invention may be a process whereby the content of the binder in the nonwoven fabric is controlled. For example, the physical properties of the sound absorbing and insulating material can be controlled. The content of the binder included in the nonwoven fabric after the drying may be an important factor determining the size, shape and distribution of micro cavities inside the sound absorbing and insulating material. Accordingly, the sound-absorbing property and mechanical property of the sound absorbing and insulating material may be controlled therewith. In the present invention, the drying may be carried out such that the final content of the binder included in the nonwoven fabric may be an amount of about 1 to 300 parts by weight, or particularly of about 30 to 150 parts by weight, based on 100 parts by weight of the nonwoven fabric.

In the step c), an outer layer may be prepared to include an amount of about 30 100 wt % of a heat-resistant fiber based on the total weight of the second nonwoven fabric.

In the step d), the outer layer may be stacked on one or both sides of the inner layer. That is to say, by stacking the outer layer formed of a nonwoven fabric on one or both sides of the inner layer, appearance problem due to leakage of the binder included in the inner layer during molding and contamination of a mold due to repeated molding may be prevented.

The stacking may be accomplished by bonding using an adhesive or using heat or pressure. For example, when the stacking is performed using an adhesive, an adhesive may be coated on one side of the outer layer and then stacking the outer layer on the inner layer.

The method for manufacturing a sound absorbing and insulating material according to the present invention may further include, after the step d), a step of e) molding the sound absorbing and insulating material at high temperature.

For example, the method for manufacturing a sound absorbing and insulating material may include: a) immersing a first nonwoven fabric comprising an amount of about 30 to 100 wt % of a heat-resistant fiber based on the total weight of the first nonwoven fabric in a binder solution; b) forming an inner layer 1 by drying the first nonwoven fabric; c) preparing an outer layer 2', 2" comprising a second nonwoven fabric comprising an amount of about 30 to 100 wt % of a heat-resistant fiber based on the total weight of the second nonwoven fabric; d) stacking the outer layer on one or both sides of the inner layer 1; and e) molding the sound absorbing and insulating material at high temperature.

In the step e), the sound absorbing and insulating material may be molded at high temperature after stacking the inner layer and the outer layer. The molding at high temperature considers also the curing of the thermosetting binder and may be carried out at a temperature of about 150 to 300° C., or particularly at a temperature of about 170 to 230° C.

The method for manufacturing a sound absorbing and insulating material according to the present invention may further include, before the step a), a step of a-1) forming a first nonwoven fabric or a second nonwoven fabric by a needle punching process using a heat-resistant fiber. For example, in the step a-1), the first nonwoven fabric or the second nonwoven fabric having a thickness of about 3 to 20 mm may be formed by a needle punching process of a heat-resistant aramid fiber having a fineness of about 1 to 15 denier.

For example, the method for manufacturing a sound absorbing and insulating material according to the present invention including the step a-1) may include: a-1) forming a first nonwoven fabric or a second nonwoven fabric by a needle punching process using a heat-resistant fiber; a) immersing the first nonwoven fabric comprising an amount of about 30 to 100 wt % of a heat-resistant fiber based on the total weight of the first nonwoven fabric in a binder solution; b) forming an inner layer 1 by drying the first nonwoven fabric; c) preparing an outer layer 2', 2" comprising a second nonwoven fabric comprising an amount of about 30 to 100 wt % of a heat-resistant fiber based on the total weight of the second nonwoven fabric; d) stacking the outer layer on one or both sides of the inner layer 1.

For example, the method for manufacturing a sound absorbing and insulating material according to the present invention including the step a-1) may also include: a-1) forming a first nonwoven fabric or a second nonwoven fabric by a needle punching process using a heat-resistant fiber; a) immersing the first nonwoven fabric comprising an amount of about 30 to 100 wt % of a heat-resistant fiber based on the total weight of the first nonwoven fabric in a binder solution; b) forming an inner layer 1 by drying the first nonwoven fabric; c) preparing an outer layer 2', 2" comprising a second nonwoven fabric comprising an amount of about 30 to 100 wt % of a heat-resistant fiber based on the total weight of the second nonwoven fabric; d) stacking the outer layer on one or both sides of the inner layer 1; and e) molding the sound absorbing and insulating material at high temperature.

The nonwoven fabric used for the inner layer and the outer layer in the present invention may be a nonwoven fabric prepared by a needle punching process, which may include an amount of about 30 to 100 wt % of a heat-resistant fiber based on the total weight of the first or the second nonwoven fabric. The sound-absorbing property may vary depending on the thickness and density of the nonwoven fabric. It is expected that the sound-absorbing property may improve as the thickness and density of the nonwoven fabric are increased.

The first nonwoven fabric or the second nonwoven fabric used in the present invention may have a thickness of about 3 to 20 mm when considering the industrial field and the like where the sound absorbing and insulating material is used. When the thickness of the nonwoven fabric is less than about 3 mm, the durability and moldability of the sound absorbing and insulating material may be unsatisfactory. When the thickness is greater than about 20 mm, productivity may decrease and production cost may increase.

The density of the nonwoven fabric may be of about 100 to 2000 g/m$^2$, or of about 200 to 1200 g/m$^2$, or particularly of about 300 to 800 g/m$^2$, when considering performance and cost.

The nonwoven fabric may be formed by stacking a web of about 30 to 100 g/m$^2$ formed by carding 2- to 12-fold and continuously performing up-down preneedling, down-up needling and up-down needling, thereby forming physical bridges that provide the necessary thickness, binding strength and other desired physical properties. The needle used to perform the needling may be a barb-type needle, having a working blade of about 0.5 to 3 mm and a needle length (the distance from crank outside to point) of about 70 to 120 mm. Particularly, the needle stroke may be about 30 to 350 times/m$^2$.

Preferably, the fineness of yarn for the nonwoven fabric may be of about 1.5 to 8.0 denier, the thickness of the pile layer may be about 6 to 13 mm, the needle stroke may be about 120 to 250 times/m$^2$, and the density of the nonwoven fabric may be about 300 to 800 g/m$^2$.

The internal structure of the sound absorbing and insulating material manufactured by the method described above may be confirmed using an electron microscope. When observed with an electron microscope, the sound absorbing and insulating material of the present invention may have the micro cavities having a size of about 1 to 100 μm distributed inside thereof. The micro cavities may be distributed regularly or irregularly with a spacing of about 0.1 to 500 μm.

In another aspect, the present invention provides a method for reducing noise of a noise-generating device, including: i) checking a three-dimensional shape of a noise-generating device; ii) preparing and molding a sound absorbing and insulating material so as to correspond to the three-dimensional shape of the device partially or entirely; and iii) bringing the sound absorbing and insulating material adjacent to the noise-generating device.

The device may be a noise-generating device including a motor, an engine, an exhaust system and the like. However, the scope of the device may not be limited to the motor, engine and exhaust system. The sound absorbing and insulating material may be manufactured to correspond to the three-dimensional shape of the device partially or entirely. Since the sound absorbing and insulating material of the present invention may be moldable during curing of the binder, the sound absorbing and insulating material may be molded to correspond to the three-dimensional shape of the device partially or entirely.

The expression "adjacent" means closely attaching the sound absorbing and insulating material to the noise-generating device, providing it with a distance from the noise-generating device, or molding it as a part of the noise-generating device. The expression adjacent also includes mounting the sound absorbing and insulating material to a member connected to the noise-generating device (e.g., another sound absorbing and insulating material).

FIGS. 3A-3B and FIGS. 4A-4B schematically show representative examples wherein the sound absorbing and insulating material of the present invention may be applied to a noise-generating device of a vehicle.

Figure 3A:
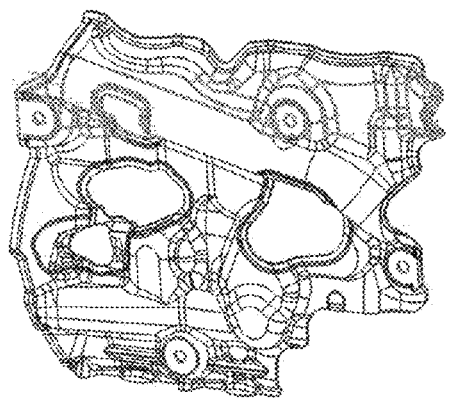
FIGS. 3A-3B schematically show an exemplary sound absorbing and insulating material applied to a noise-generating device of a vehicle after molding as a part.
Figure 3B:
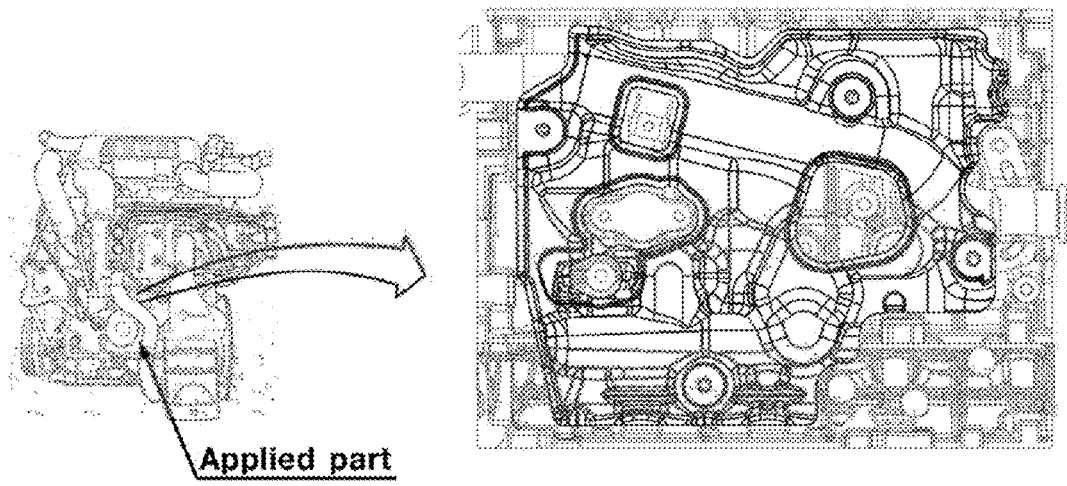

FIGS. 3A-3B schematically show an exemplary sound absorbing and insulating material that may be molded as a part and applied to a noise-generating device of a vehicle. FIG. 3A is an image of a sound absorbing and insulating material molded to be used in a vehicle engine, and FIG. 3B shows an example wherein the sound absorbing and insulating material is applied in a part of a vehicle engine.

Figure 4A:
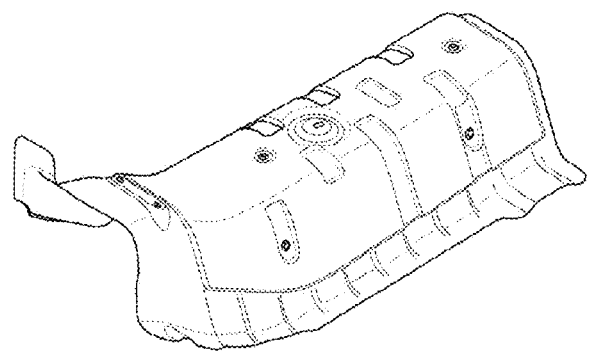
FIGS. 4A-4B schematically shows an example wherein an exemplary sound absorbing and insulating material is applied to noise-generating device of a vehicle with some distance.
Figure 4B:
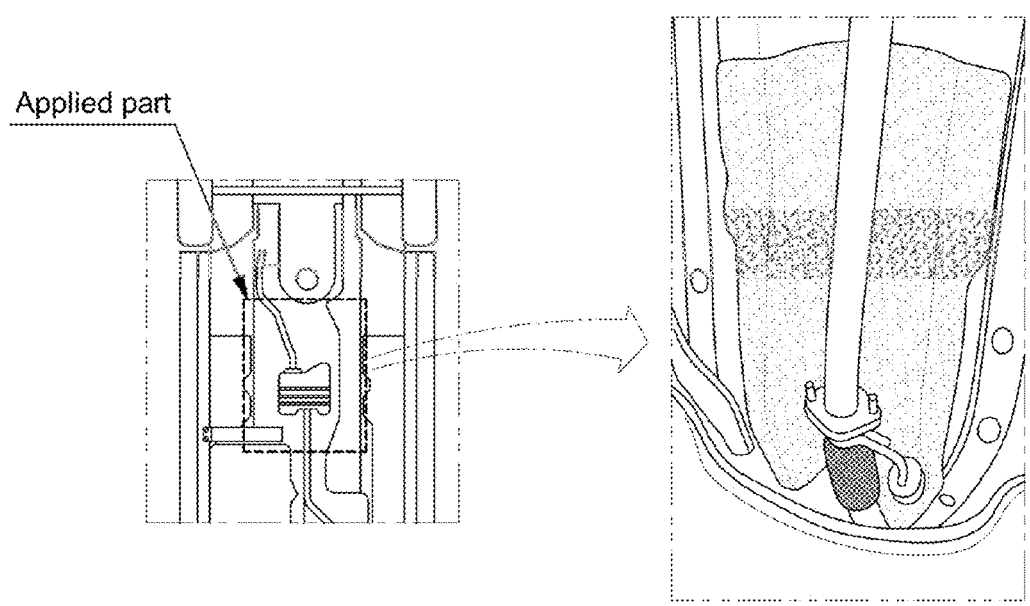

FIGS. 4A-4B schematically show an example wherein a sound absorbing and insulating material is applied to a noise-generating device of a vehicle. FIG. 4A is an image of a sound absorbing and insulating material molded to be used in a lower part of a vehicle, and FIG. 4B shows an example wherein the sound absorbing and insulating material is attached to a lower part of a vehicle.

As described above, the sound absorbing and insulating material of the present invention, wherein the binder is impregnated to maintain the three-dimensional structure in the inner layer, may have superior sound-absorbing property, flame retardancy, heat resistance and heat-insulating property and may provide the desired sound-absorbing performance without deformation after molding when directly applied to a noise-generating device maintained at high temperatures of about 200° C. or above. In addition, because the outer layer comprising the second nonwoven fabric not impregnated with a binder is stacked on the surface of the inner material, appearance problem due to leakage of the binder included in the inner layer during molding and contamination of a mold due to repeated molding may be prevented.

EXAMPLES

Hereinafter, the present invention is described in more detail through examples. However, the scope of the present invention is not limited by the examples.

Preparation of Sound Absorbing and Insulating Material

Example 1. Preparation of Sound Absorbing and Insulating Material in which Outer Layers are Stacked on Both Sides 1) Preparation of Epoxy Resin-Impregnated First Aramid Nonwoven Fabric A meta-aramid short fiber having a limiting oxygen index (LOI) of 40%, a heat resistance temperature of 300° C., a fineness of 2 denier and a length of 51 mm was air blown and formed into a web of 30 g/m$^2$ through carding. The web was stacked by overlapping 10-fold on a conveyor belt operated at 5 m/min using a horizontal wrapper. A first aramid nonwoven fabric having a density of 300 g/m$^2$ and a thickness of 6 mm was prepared by continuously performing up-down needling, down-up needling and up-down needling with a needle stroke of 150 times/m$^2$.

2) Preparation of Inner Layer

The prepared first nonwoven fabric was immersed in a binder solution with 1 dip 1 nip (pick-up 300%). The binder solution contained 8 wt % of bisphenol A diglycidyl ether, 2 wt % of bisphenol A diglycidyl ether polymer, 0.2 wt % of dicyandiamide, 0.02 wt % of dimethylurea, 10 wt % of melamine cyanurate and 79.78 wt % of dimethyl carbonate, based on the total weight of the binder solution.

The nonwoven fabric was taken out from the binder solution, compressed at a pressure of 8 kgf/cm$^2$ using a roller and then dried by passing through drying ovens at a temperature of 100° C., 120° C. and 150° C. at a speed of 5 m/min. The dried nonwoven fabric, i.e. an inner layer, contained 50 parts by weight of a binder based on 100 parts by weight of the nonwoven fabric.

3) Preparation of Second Aramid Nonwoven Fabric

A meta-aramid short fiber having a limiting oxygen index (LOI) of 40%, a heat resistance temperature of 300° C., a fineness of 2 denier and a length of 51 mm was air blown and formed into a web of 30 g/m$^2$ through carding. The web was stacked by overlapping 10-fold on a conveyor belt operated at 5 m/min using a horizontal wrapper. A second aramid nonwoven fabric having a density of 120 g/m$^2$ and a thickness of 2 mm was prepared by continuously performing up-down needling, down-up needling and up-down needling with a needle stroke of 150 times/m$^2$.

4) Preparation of Sound Absorbing and Insulating Material in which Outer Layers are Stacked on Both Sides Two felts were prepared by gravure-treating one side of the second nonwoven fabric prepared in 3) with an adhesive solution and then drying at a temperature of 50° C. The adhesive solution contained 16 wt % of bisphenol A diglycidyl ether, 4 wt % of bisphenol A diglycidyl ether polymer, 0.2 wt % of dicyandiamide, 0.02 wt % of dimethylurea and 79.78 wt % of dimethyl carbonate, based on the total weight of the adhesive solution.

The prepared two felts were stacked on both sides of the inner layer prepared in 2) such that the side where the adhesive had been coated were contacted with the inner layer. The prepared sound absorbing and insulating material was molded into a desired shape by curing at a temperature of 200° C. for 2 minutes.

Comparative Example 1. Preparation of Sound Absorbing and Insulating Material Formed of Aramid Nonwoven Fabric An aramid nonwoven fabric having a density of 300 g/m$^2$ and a thickness of 6 mm was prepared by needle punching as described in Example 1 for use as a sound absorbing and insulating material.

Comparative Example 2. Preparation of Sound Absorbing and Insulating Material Formed of Epoxy Resin-Coated Aramid Nonwoven Fabric An aramid nonwoven fabric having a density of 300 g/m$^2$ and a thickness of 6 mm was prepared by needle punching as described in Example 1. Subsequently, a coating solution containing an epoxy resin was coated on the surface of the nonwoven fabric so that the content of a binder was 50 parts by weight based on 100 parts by weight of the nonwoven fabric. Then, the nonwoven fabric was molded after drying at a temperature of 150° C.

The coating solution contained 8 wt % of bisphenol A diglycidyl ether, 2 wt % of bisphenol A diglycidyl ether polymer, 0.2 wt % of dicyandiamide, 0.02 wt % of dimethylurea, 10 wt % of melamine cyanurate and 79.78 wt % of dimethyl carbonate based on the total weight of the coating solution.

Comparative Example 3. Preparation of Sound Absorbing and Insulating Material Formed of Thermoplastic Resin-Impregnated Aramid Nonwoven Fabric An aramid nonwoven fabric having a density of 300 g/m$^2$ and a thickness of 6 mm was prepared by needle punching as described in Example 1. The nonwoven fabric was immersed in a binder solution, dried and then molded.

The binder solution was a thermoplastic resin solution containing 10 wt % of polyethylene resin, 10 wt % of melamine cyanurate and 80 wt % of dimethyl carbonate (DMC) based on the total weight of the binder solution.

Comparative Example 4. Preparation of Sound Absorbing and Insulating Material Formed of Epoxy Resin-Impregnated PET Nonwoven Fabric A polyethylene terephthalate (PET) nonwoven fabric having a density of 300 g/m$^2$ and a thickness of 6 mm was prepared by needle punching as described in Example 1. The nonwoven fabric was immersed in a binder solution, dried and then molded.

The PET nonwoven fabric prepared in Comparative Example 4 was thermally deformed due to the reaction heat produced during the curing of epoxy and could not be molded into a desired shape because it was completely thermally deformed during the drying and thermal molding processes.

Evaluation of Physical Properties of Sound Absorbing and Insulating Materials

The physical properties of the sound absorbing and insulating materials were measured and compared as follows.

1. Evaluation of Heat Resistance

To evaluate heat resistance, the sound absorbing and insulating material was aged in an oven at a temperature of 260° C. for 300 hours. After keeping at standard state (temperature 23±2° C., 50±5% relative humidity) for at least 1 hour, appearance was inspected and tensile strength was measured. It was visually inspected whether there were shrinkage or deformation, surface peeling, fluffing and cracking. The tensile strength was measured using a dumbbell-type No. 1 for randomly selected five sheets of test samples at a speed of 200 mm/min under a standard condition.

2. Evaluation of Thermal Cycle

The durability of the sound absorbing and insulating material was evaluated by the thermal cycle test method. The durability was determined after performing five cycles under the following conditions.

1) Condition of One Cycle

Room temperature→high temperature (150° C.×3 hr)→room temperature→low temperature (−30° C.×3 hr)→room temperature→humid condition (50° C.×95% RH).

2) Durability Evaluation Standard

After the thermal cycle test, the change in appearance was inspected. For example, surface damage, swelling, breaking and discoloring were inspected. If there was no change in appearance, the sound absorbing and insulating material was evaluated as 'no abnormality'.

3. Evaluation of Flame Retardancy

The flame retardancy of the sound absorbing and insulating material was measured according to the ISO 3795 flammability test method.

4. Evaluation of Nonflammability

The nonflammability of the sound absorbing and insulating material was measured according to the UL94 vertical burn test.

Test Example 1. Comparison of Properties of Sound Absorbing and Insulating Materials Depending on Heat-Resistant Fibers In Test Example 1, the physical properties of sound absorbing and insulating materials prepared with different heat-resistant fiber yarns were compared. The inner layer were formed by preparing first nonwoven fabrics having a density of 300 g/m² and a thickness of 6 mm by a needle punching process as described in Example 1, immersing them in a binder solution, drying them and then molding. The nonwoven fabrics were prepared using yarns having a fineness of 2 denier and a length of 51 mm, which are described in Table 1.

As outer layers, second nonwoven fabrics having a density 120 of g/m² and a thickness of 2 mm prepared by a needle punching process as in Example 1 were used. Sound absorbing and insulating material were prepared by stacking the outer layers on both sides of the inner layer as described in Example 1.

The physical properties of the prepared sound absorbing and insulating materials were measured as described above. The result of measuring the properties of the sound absorbing and insulating materials prepared with different heat-resistant fibers is shown in Table 1 and Table 2.

TABLE 1

| | | Physical properties of sound absorbing and insulating materials | | | | | | |
|---|---|---|---|---|---|---|---|---|
| | | Yarn 1 | Yarn 2 | Yarn 3 | Yarn 4 | Yarn 5 | Yarn 6 | Yarn 7 |
| Yarn | Yarn material | aramid | PPS | PI | PBI | PBO | oxi-PAN | PK |
| | Limiting oxygen index | 40 | 30 | 50 | 40 | 60 | 65 | 30 |
| | Heat resistance temperature (° C. × 1 hr) | 300 | 230 | 300 | 300 | 300 | 300 | 300 |
| Heat resistance | Appearance | No abnormality | No abnormality | No abnormality | No abnormality | No abnormality | No abnormality | No abnormality |
| | Tensile strength (Kgf/cm²) | 200 | 180 | 220 | 200 | 210 | 210 | 200 |
| Thermal cycle | Appearance | No abnormality | No abnormality | No abnormality | No abnormality | No abnormality | No abnormality | No abnormality |
| Flame retardancy | | Self-extinguishing | Self-extinguishing | Self-extinguishing | Self-extinguishing | Self-extinguishing | Self-extinguishing | Self-extinguishing |
| Nonflammability | | Nonflammable | Nonflammable | Nonflammable | Nonflammable | Nonflammable | Nonflammable | Nonflammable |

5. Evaluation of Sound-Absorbing Property

The sound-absorbing property of the sound absorbing and insulating material was measured according to the ISO 354 method.

6. Evaluation of Air Permeability

1) Evaluation Method

The test sample was mounted on a Frazier-type tester and the amount of air flowing through the sample vertically was measured. The area of the test sample through which the air passed was 5 cm² and the applied pressure was set to 125 pascal (Pa).

TABLE 2

| | Sound-absorbing rate of sound absorbing and insulating materials | | | |
|---|---|---|---|---|
| Frequency (Hz) | Yarn 1 (aramid) | Yarn 2 (PPS) | Yarn 6 (oxi-PAN) | Yarn 7 (PK) |
| 400 | 0.08 | 0.05 | 0.08 | 0.05 |
| 500 | 0.10 | 0.06 | 0.09 | 0.06 |
| 630 | 0.16 | 0.09 | 0.13 | 0.08 |
| 800 | 0.23 | 0.15 | 0.22 | 0.19 |
| 1000 | 0.35 | 0.30 | 0.35 | 0.26 |

TABLE 2-continued

| | Sound-absorbing rate of sound absorbing and insulating materials | | | |
|---|---|---|---|---|
| Frequency (Hz) | Yarn 1 (aramid) | Yarn 2 (PPS) | Yarn 6 (oxi-PAN) | Yarn 7 (PK) |
| 1250 | 0.44 | 0.39 | 0.45 | 0.37 |
| 1600 | 0.59 | 0.49 | 0.57 | 0.31 |
| 2000 | 0.70 | 0.66 | 0.68 | 0.48 |
| 2500 | 0.79 | 0.71 | 0.80 | 0.67 |
| 3150 | 0.83 | 0.80 | 0.85 | 0.78 |
| 4000 | 0.86 | 0.83 | 0.88 | 0.84 |
| 5000 | 0.99 | 0.95 | 0.92 | 0.83 |
| 6300 | 0.98 | 0.96 | 0.98 | 0.89 |
| 8000 | 0.99 | 0.95 | 0.89 | 0.95 |
| 10000 | 0.98 | 0.97 | 0.99 | 0.95 |

As seen from Table 1 and Table 2, all the sound absorbing and insulating materials prepared using heat-resistant fibers having a limiting oxygen index of 25% or greater and a heat resistance temperature of 150° C. or greater as presented by the present invention exhibited satisfactory heat resistance, durability, flame retardancy, nonflammability and sound-absorbing property. Accordingly, it was confirmed that common heat-resistant fibers known as super fiber can be used as the material of the nonwoven fabric of the sound absorbing and insulating material according to the present invention.

Test Example 2. Comparison of Properties of Sound Absorbing and Insulating Materials Depending on Density of Nonwoven Fabric In Test Example 2, sound absorbing and insulating materials were prepared in the same manner as in Example 1 using first nonwoven fabrics having different densities. The sound-absorbing performance of the prepared sound absorbing and insulating materials is shown in FIG. 5.

Figure 5:
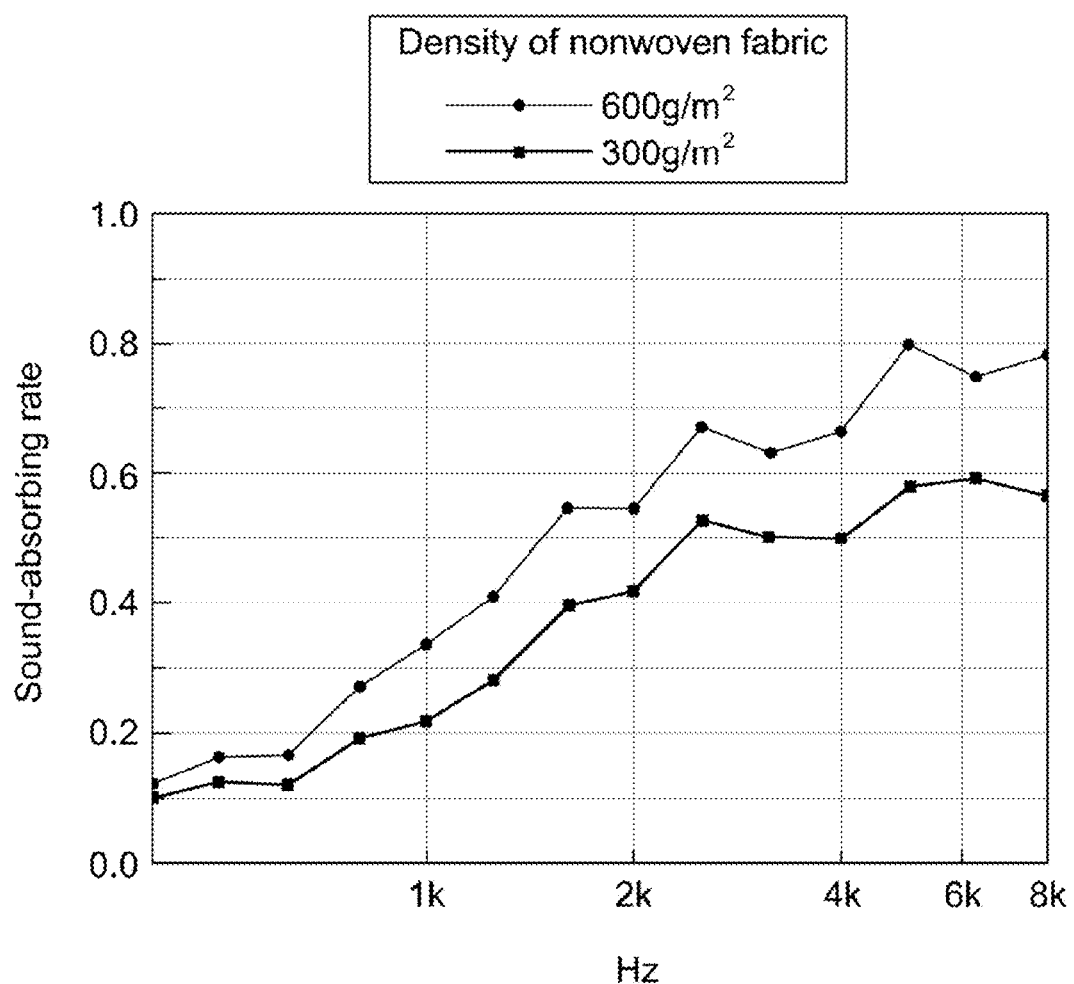
FIG. 5 is a graph comparing the sound-absorbing performance of an exemplary sound absorbing and insulating material depending on the density of a nonwoven fabric.

As seen from FIG. 5, the sound-absorbing performance of the sound absorbing and insulating material was superior when a first nonwoven fabric having a density of 600 g/m² was used than when a first nonwoven fabric having a density of 300 g/m² was used.

Test Example 3. Evaluation of Physical Properties of Sound Absorbing and Insulating Materials In Test Example 3, the properties of sound absorbing and insulating materials depending on the method by which a thermosetting binder was applied to a nonwoven fabric formed of a heat-resistant fiber were compared.

That is to say, the sound-absorbing rate of the sound absorbing and insulating material prepared by forming an inner layer by impregnating the thermosetting binder into the first nonwoven fabric (Example 1), the sound absorbing and insulating material formed of the first nonwoven fabric (Comparative Example 1) and the sound absorbing and insulating material prepared by coating the thermosetting binder on the first nonwoven fabric (Comparative Example 2) was compared. The result of measuring the sound-absorbing rate of the sound absorbing and insulating material formed of the sound absorbing and insulating material formed of the nonwoven fabric (Comparative Example 1), the sound absorbing and insulating material prepared by coating the thermosetting binder on the surface of the nonwoven fabric (Comparative Example 2) and the sound absorbing and insulating material prepared using the inner layer wherein the thermosetting binder is impregnated into the nonwoven fabric (Example 1) is shown in Table 3.

TABLE 3

| | Sound-absorbing rate | | |
|---|---|---|---|
| Frequency (Hz) | Comparative Example 1 | Comparative Example 2 | Example 1 |
| 400 | 0.01 | 0.02 | 0.08 |
| 500 | 0.03 | 0.03 | 0.10 |
| 630 | 0.12 | 0.05 | 0.17 |
| 800 | 0.16 | 0.08 | 0.24 |
| 1000 | 0.26 | 0.12 | 0.35 |
| 1250 | 0.32 | 0.15 | 0.46 |
| 1600 | 0.39 | 0.22 | 0.59 |
| 2000 | 0.48 | 0.29 | 0.72 |
| 2500 | 0.64 | 0.40 | 0.79 |
| 3150 | 0.63 | 0.57 | 0.83 |
| 4000 | 0.72 | 0.68 | 0.86 |
| 5000 | 0.80 | 0.77 | 0.98 |
| 6300 | 0.78 | 0.82 | 0.99 |
| 8000 | 0.89 | 0.98 | 0.99 |
| 10000 | 0.90 | 0.98 | 0.98 |

As seen from Table 3, the sound absorbing and insulating material according to the present invention showed superior sound-absorbing rate in all frequency ranges as compared to Comparative Example 1 wherein the nonwoven fabric not impregnated with the thermosetting binder was used as the nonwoven fabric. In contrast, the sound absorbing and insulating material of Comparative Example 2 wherein the nonwoven fabric on which the thermosetting binder was coated was used showed lower sound-absorbing rate than the nonwoven fabric (Comparative Example 1) in the frequency range of 400 to 5000 Hz.

Test Example 4. Evaluation of Heat-Insulating Performance of Sound Absorbing and Insulating Materials In Test Example 4, the heat-insulating performance of the sound absorbing and insulating materials prepared in Example 1, Comparative Example 1 and Comparative Example 3 was evaluated. After applying heat of 1000° C. from one side of a 25-mm thick sample of each sound absorbing and insulating material for 5 minutes, temperature was measured on the opposite side of the sample.

The temperature measured on the opposite side of the sound absorbing and insulating material was 250° C. for the surface layer of Example 1 and 350° C. for the sound absorbing and insulating material of Comparative Example 1. Accordingly, it was confirmed that the sound absorbing and insulating material of the present invention wherein the thermosetting resin was impregnated exhibits improved heat-insulating performance. In contrast, the thermoplastic resin-impregnated sound absorbing and insulating material of Comparative Example 3 melted down and deformed as soon as the heat a temperature of 1000° C. was applied.

Accordingly, it can be seen that the sound absorbing and insulating material of the present invention has very superior heat-insulating property.

Test Example 5. Comparison of Heat-Insulating Performance with Aluminum Heat-Insulating Plate In Test Example 5, the heat-insulating performance of the sound absorbing and insulating material of Example 1 was compared with that of an aluminum heat-insulating plate. While applying the same heat from one side of the sound absorbing and insulating material and the heat-insulating plate at a temperature of 250° C., the temperature at the opposite side was measured with time. The result is shown in FIG. 6.

Figure 6:
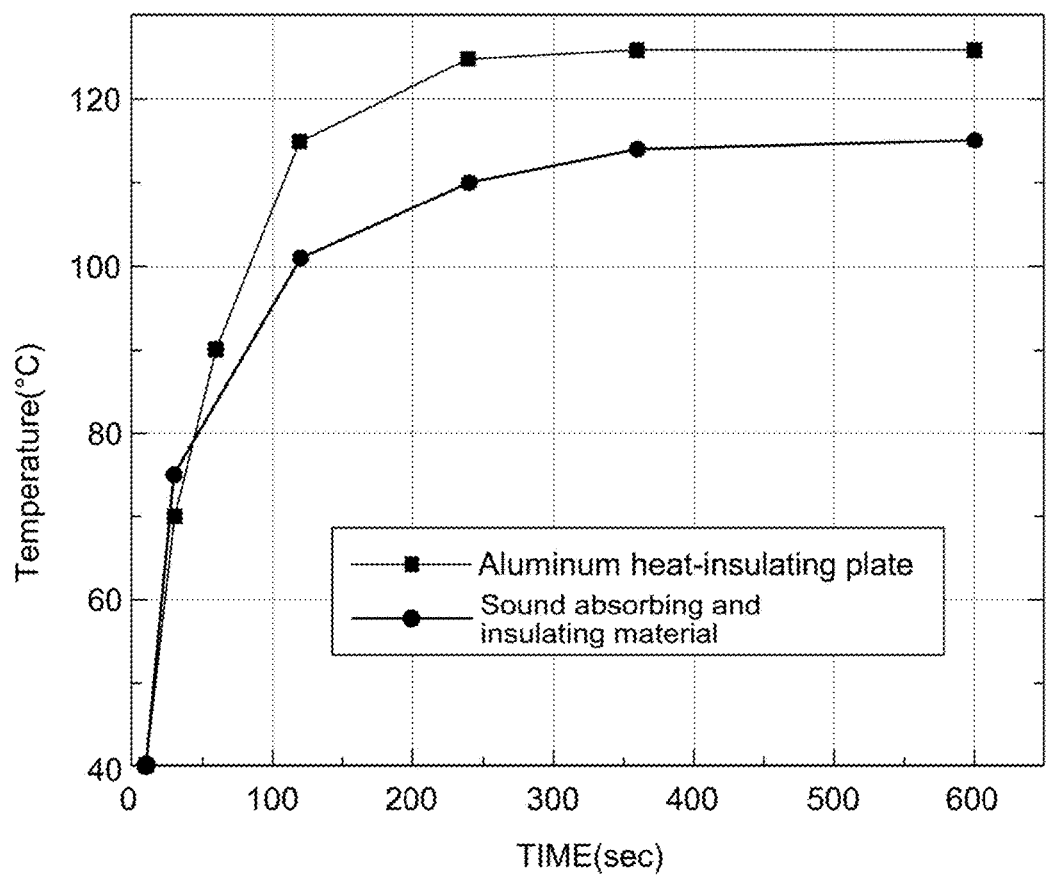
FIG. 6 is a graph comparing the heat-insulating performance between an aluminum heat-insulating plate and an exemplary sound absorbing and insulating material of the present invention.

As seen from FIG. 6, the sound absorbing and insulating material according to the present invention showed better heat-insulating performance with the heat resistance temperature at least 11° C. lower as compared to the aluminum heat-insulating plate.

Test Example 6. Comparison of Properties of Sound Absorbing and Insulating Material Depending on Binder Content Sound absorbing and insulating materials were prepared in the same manner as in Example 1. The epoxy resin-impregnated first aramid nonwoven fabric was dried to have different final binder contents. The binder content was represented as parts by weight of the binder included in the sound absorbing and insulating material based on 100 parts by weight of the dried nonwoven fabric.

The result of comparing the mechanical properties and sound-absorbing rate of the sound absorbing and insulating materials prepared with different binder contents is shown in Table 4 and Table 5.

TABLE 5

Sound-absorbing rate of surface layers with different binder contents

| Frequency (Hz) | 0 parts by weight | 10 parts by weight | 50 parts by weight | 100 parts by weight | 200 parts by weight |
|---|---|---|---|---|---|
| 400 | 0.01 | 0.01 | 0.08 | 0.06 | 0.02 |
| 500 | 0.03 | 0.04 | 0.10 | 0.09 | 0.04 |
| 630 | 0.12 | 0.14 | 0.16 | 0.15 | 0.09 |
| 800 | 0.16 | 0.17 | 0.23 | 0.25 | 0.11 |
| 1000 | 0.26 | 0.26 | 0.35 | 0.30 | 0.14 |
| 1250 | 0.32 | 0.34 | 0.44 | 0.42 | 0.17 |
| 1600 | 0.39 | 0.41 | 0.59 | 0.54 | 0.22 |
| 2000 | 0.48 | 0.55 | 0.70 | 0.58 | 0.35 |
| 2500 | 0.64 | 0.68 | 0.79 | 0.67 | 0.44 |
| 3150 | 0.63 | 0.69 | 0.83 | 0.72 | 0.52 |
| 4000 | 0.72 | 0.77 | 0.86 | 0.75 | 0.53 |
| 5000 | 0.80 | 0.83 | 0.99 | 0.79 | 0.57 |
| 6300 | 0.78 | 0.88 | 0.98 | 0.80 | 0.63 |
| 8000 | 0.89 | 0.91 | 0.99 | 0.90 | 0.70 |
| 10000 | 0.90 | 0.92 | 0.98 | 0.92 | 0.71 |

As seen from Table 4 and Table 5, the sound-absorbing rate was improved as the binder was impregnated into the nonwoven fabric when compared with the nonwoven fabric not impregnated with the binder. Also, it was confirmed that the sound-absorbing rate of the sound absorbing and insulating material could be controlled with the binder content.

Test Example 7. Comparison of Properties of Sound Absorbing and Insulating Material Depending on Binders Sound absorbing and insulating materials wherein 50 parts by weight of a binder was impregnated based on 100 parts by weight of a first aramid nonwoven fabric were prepared in the same manner as in Example 1. The resins described in Table 6 were used as the binder.

The result of comparing the mechanical properties and sound-absorbing rate of the sound absorbing and insulating materials prepared with different binders is shown in Table 6.

TABLE 4

Mechanical properties of sound absorbing and surface layers with different binder contents
Binder content (parts by weight)

| | 0 | 10 | 50 | 100 | 200 |
|---|---|---|---|---|---|
| Air permeability (mL/cm² · s) | 500 | 380 | 350 | 320 | 210 |
| Tensile strength (kg/cm²) | 40 | 60 | 200 | 240 | 310 |
| Nonflammability | Nonflammable | Nonflammable | Nonflammable | Nonflammable | Nonflammable |

TABLE 6

Physical properties of sound absorbing and insulating materials with different binders

| | Binder resin | | | | |
|---|---|---|---|---|---|
| | Epoxy | Phenol | Urea | Melamine | Polyurethane |
| Heat resistance temperature (° C. × 1 hr) | 300 | 260 | 190 | 300 | 200 |
| Tensile strength (kg/cm$^2$) | 200 | 165 | 180 | 180 | 170 |
| Flame retardancy | Self-extinguishing | Self-extinguishing | Self-extinguishing | Self-extinguishing | Self-extinguishing |
| Nonflammability | Nonflammable | Nonflammable | Nonflammable | Nonflammable | Nonflammable |

What is claimed is:

1. A sound absorbing and insulating material comprising:
an inner layer comprising a first nonwoven fabric comprising an amount of about 30 to 100 wt % of a heat-resistant fiber based on the total weight of the first nonwoven fabric and a binder present in the same layer as the first nonwoven fabric and maintaining a three-dimensional structure in the inner layer, wherein the binder is uniformly distributed and attached to the surface of a fiber yarn of the first nonwoven fabric and maintains or further forms micro cavities of the first nonwoven fabric; and
an outer layer comprising a second nonwoven fabric which comprises an amount of about 30 to 100 wt % of a heat-resistant fiber based on the total weight of the second nonwoven fabric and is not be impregnated with a binder,
wherein the outer layer is stacked on one or both sides of the inner layer.

2. The sound absorbing and insulating material according to claim 1, wherein the inner layer and the outer layer is stacked by an adhesive, heat or pressure.

3. The sound absorbing and insulating material according to claim 1, wherein an adhesive is coated on one side of the outer layer and then the outer layer is stacked by contacting the adhesive-coated side with the inner layer.

4. The sound absorbing and insulating material according to claim 3, wherein the adhesive used for the stacking between the inner layer and the outer layer is the same binder included in the first nonwoven fabric.

5. The sound absorbing and insulating material according to claim 4, wherein the adhesive is a thermosetting resin.

6. The sound absorbing and insulating material according to claim 1, wherein the heat-resistant fiber constituting the first nonwoven fabric or the second nonwoven fabric has a limiting oxygen index (LOI) of about 25% or greater and a heat resistance temperature of about 150° C. or greater.

7. The sound absorbing and insulating material according to claim 6, wherein the heat-resistant fiber is one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber.

8. The sound absorbing and insulating material according to claim 7, wherein the heat-resistant fiber is an aramid fiber.

9. The sound absorbing and insulating material according to claim 1, wherein the first nonwoven fabric or the second nonwoven fabric comprises an aramid fiber having a fineness of about 1 to 15 denier and is a single-layered nonwoven fabric having a thickness of about 3 to 20 mm.

10. The sound absorbing and insulating material according to claim 1, wherein the first nonwoven fabric or the second nonwoven fabric has a density of about 100 to 2000 g/m$^2$.

11. The sound absorbing and insulating material according to claim 10, wherein the first nonwoven fabric or the second nonwoven fabric has a density of about 200 to 1200 g/m$^2$.

12. The sound absorbing and insulating material according to claim 1, wherein the inner layer is formed in a single layer or multiple layers.

13. The sound absorbing and insulating material according to claim 1, wherein the binder included in the inner layer is a thermosetting resin.

14. The sound absorbing and insulating material according to claim 5, wherein the thermosetting resin is an epoxy resin.

15. The sound absorbing and insulating material according to claim 14, wherein the epoxy resin is one or more epoxy resin selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin and an o-cresol novolac epoxy resin.

16. The sound absorbing and insulating material according to claim 1, wherein the sound absorbing and insulating material is molded to have a three-dimensional shape corresponding to that to which the sound absorbing and insulating material is applied.

17. The sound absorbing and insulating material according to claim 16, wherein the sound absorbing and insulating material is for a vehicle.

18. A method for manufacturing the sound absorbing and insulating material according to claim 1, comprising:
a) immersing a first nonwoven fabric comprising an amount of about 30 to 100 wt % of a heat-resistant fiber based on the total weight of the first nonwoven fabric in a binder solution;
b) forming an inner layer by drying the first nonwoven fabric; and
c) preparing an outer layer by stacking a second nonwoven fabric comprising an amount about 30 to 100 wt % of a heat-resistant fiber based on the total weight of the first nonwoven fabric
d) stacking the outer layer on one or both sides of the inner layer.

19. The method for manufacturing the sound absorbing and insulating material according to claim 18, wherein which further comprises, after the step d), a step of e) molding the sound absorbing and insulating material at a temperature of about 150 to 300° C.

20. The method for manufacturing the sound absorbing and insulating material according to claim 18, wherein in the step b), the first nonwoven fabric is dried at a temperature of about 70 to 200° C. and the inner layer formed by the drying comprises an amount of about 1 to 300 parts by weight of a binder based on 100 parts by weight of the nonwoven fabric.

21. The method for manufacturing the sound absorbing and insulating material according to claim 18, wherein in the step d), the outer layer is stacked on the inner layer by an adhesive, heat or pressure.

22. The method for manufacturing the sound absorbing and insulating material according to claim 21, wherein in the step d), an adhesive is coated on one side of the second nonwoven fabric and the side on which the adhesive has been coated is contacted with the inner layer.

23. The method for manufacturing the sound absorbing and insulating material according to claim 22, wherein the adhesive is the same binder included in the first nonwoven fabric.

24. The method for manufacturing the sound absorbing and insulating material according to claim 23, wherein the adhesive is a thermosetting resin.

25. The method for manufacturing the sound absorbing and insulating material according to claim 18, wherein the heat-resistant fiber constituting the first nonwoven fabric or the second nonwoven fabric has a limiting oxygen index (LOI) of about 25% or greater and a heat resistance temperature of 150° C. or greater.

26. The method for manufacturing the sound absorbing and insulating material according to claim 25, wherein the heat-resistant fiber is one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, basalt fiber, a silica fiber and a ceramic fiber.

27. The method for manufacturing the sound absorbing and insulating material according to claim 25, wherein the heat-resistant fiber is an aramid fiber having a fineness of about 1 to 15 denier and a yarn length of about 20 to 100 mm.

28. The method for manufacturing the sound absorbing and insulating material according to claim 18, wherein the first nonwoven fabric or the second nonwoven fabric has a thickness of about 3 to 20 mm and a density of about 100 to 2000 g/m$^2$.

29. The method for manufacturing the sound absorbing and insulating material according to claim 28, wherein the first nonwoven fabric or the second nonwoven fabric is an aramid nonwoven fabric having a thickness of about 3 to 20 mm, formed by needle punching of a heat-resistant aramid fiber having a fineness of about 1 to 15 denier.

30. The method for manufacturing the sound absorbing and insulating material according to claim 29, wherein the nonwoven fabric is formed by continuously performing up-down needling, down-up needling and up-down needling.

31. The method for manufacturing the sound absorbing and insulating material according to claim 29, wherein the nonwoven fabric is formed with a needle stroke of about 30 to 350 times/m$^2$.

32. The method for manufacturing the sound absorbing and insulating material according to claim 18, wherein the binder solution comprises an amount of about 1 to 60 wt % of a binder, an amount of about 0.1 to 10 wt % of a curing agent, an amount of about 0.01 to 5 wt % of a catalyst, an amount of about 1 to 40 wt % of an additive and a solvent constituting the remaining balance of the binder solution, all the wt % based on the total weight of the binder solution.

33. The method for manufacturing the sound absorbing and insulating material according to claim 18, wherein the binder solution comprises an amount of about 1 to 30 wt % of a binder, an amount of about 0.1 to 10 wt % of a curing agent, an amount of about 0.01 to 5 wt % of a catalyst, an amount of about 1 to 30 wt % of a flame retardant and an amount of about 40 to 95 wt % of a solvent constituting the remaining balance of the binder solution, all the wt % based on the total weight of the binder solution.

34. The method for manufacturing the sound absorbing and insulating material according to claim 33, wherein the binder is a thermosetting resin.

35. The method for manufacturing the sound absorbing and insulating material according to claim 24, wherein the thermosetting resin is an epoxy resin.

36. The method for manufacturing the sound absorbing and insulating material according to claim 35, wherein the epoxy resin is one or more selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin and an o-cresol novolac epoxy resin.

37. The method for manufacturing the sound absorbing and insulating material according claim 18, wherein the sound absorbing and insulating material is for a vehicle.

38. A method for reducing noise of a noise-generating device, comprising:

i) checking a three-dimensional shape of a noise-generating device;

ii) preparing and molding the sound absorbing and insulating material according to any of claim 1 so as to correspond to the three-dimensional shape of the device partially or entirely; and iii) bringing the sound absorbing and insulating material adjacent to the noise-generating device.

39. The method for reducing noise of a noise-generating device according to claim 38, wherein the device is a motor, an engine or an exhaust system.

40. The method for reducing noise of a noise-generating device according to claim 39, wherein the sound absorbing and insulating material is brought adjacent to the noise-generating device by attaching the sound absorbing and insulating material to the noise-generating device, providing the sound absorbing and insulating material with a distance from the noise-generating device, or molding the sound absorbing and insulating material as a part of the noise-generating device.

41. A vehicle that comprises a sound absorbing and insulating material of claim 1.

* * * * *